United States Patent [19]

Tateno et al.

[11] Patent Number: 4,899,857

[45] Date of Patent: Feb. 13, 1990

[54] AUTOMATIC TRANSMISSION APPARATUS FOR VEHICLE

[75] Inventors: Toshiaki Tateno; Shigeki Fukushima, both of Yokohama; Tomoyuki Iwamoto, Kawasaki; Nobuo Kijima, Tokyo, all of Japan

[73] Assignee: Mitsubishi Jidosha Kogyo Kabushiki Kaisha, Tokyo, Japan

[21] Appl. No.: 173,945

[22] Filed: Mar. 28, 1988

Related U.S. Application Data

[63] Continuation of Ser. No. 846,941, Apr. 1, 1986, abandoned.

[30] Foreign Application Priority Data

| Apr. 11, 1985 | [JP] | Japan | 60-75291 |
| Apr. 12, 1985 | [JP] | Japan | 60-53601 |
| Jun. 17, 1985 | [JP] | Japan | 60-131324 |
| Jun. 25, 1985 | [JP] | Japan | 60-95972 |
| Jun. 28, 1985 | [JP] | Japan | 60-141692 |
| Jul. 24, 1985 | [JP] | Japan | 60-163669 |
| Sep. 30, 1985 | [JP] | Japan | 60-150062 |

[51] Int. Cl.[4] .......................... B60K 41/28
[52] U.S. Cl. .................. 192/0.072; 192/0.09
[58] Field of Search ............. 192/0.044, 0.046, 0.049, 192/0.052, 0.062, 0.072, 0.075, 0.076, 0.09, 0.094, 1.21, 1.23, 1.33, 1.41, 3.58, 4 A, 13 A

[56] References Cited

U.S. PATENT DOCUMENTS

| 2,895,571 | 7/1959 | Hanebeck | 188/273 |
| 2,910,156 | 10/1959 | Apple | 192/1.31 |
| 2,947,392 | 8/1960 | Heine | 192/1.25 |
| 3,322,246 | 5/1967 | Noguchi | 192/0.049 |
| 3,434,575 | 3/1969 | Mizuno | 188/353 |
| 4,061,215 | 12/1977 | Ishikawa | 192/4 A |
| 4,076,093 | 2/1978 | Mizuno | 192/0.049 X |
| 4,194,608 | 3/1980 | Usui et al. | 192/0.052 X |
| 4,295,540 | 10/1981 | Hildebrecht | 192/0.09 X |
| 4,446,950 | 5/1984 | Wise et al. | 192/1.23 |
| 4,591,038 | 5/1986 | Asagi et al. | 192/0.076 X |
| 4,618,040 | 10/1986 | Honma et al. | 192/0.09 |
| 4,732,246 | 3/1988 | Tateno et al. | 192/0.052 |

FOREIGN PATENT DOCUMENTS

| 130792 | 1/1985 | European Pat. Off. |
| 130794 | 1/1985 | European Pat. Off. |
| 2613074 | 2/1977 | Fed. Rep. of Germany |
| 2717256 | 11/1977 | Fed. Rep. of Germany |
| 3243485 | 7/1983 | Fed. Rep. of Germany |
| 53-26021 | 7/1978 | Japan |
| 56-22725 | 5/1981 | Japan |
| 57-160724 | 10/1982 | Japan |
| 58-81257 | 5/1983 | Japan |
| 58-134232 | 8/1983 | Japan |
| 1154327 | 6/1969 | United Kingdom |
| 1543386 | 4/1979 | United Kingdom |

OTHER PUBLICATIONS

"Manual Transmission", *Automotive Engineering*, vol. 92, No. 1 (Jan. 1984), pp. 66–74.
Electronically Controlled Fully Automatic Transmissions for Commercial Vehicles, 1984, pp. 1463–1477.

*Primary Examiner*—Leslie A. Braun
*Assistant Examiner*—Richard M. Lorence
*Attorney, Agent, or Firm*—Hedman, Gibson, Costigan & Hoare

[57] ABSTRACT

An automatic transmission apparatus of the invention includes a friction clutch connected to the output shaft of an engine, a clutch actuator for driving the friction clutch, a parallel shaft type gear transmission whose input shaft is connected to the friction clutch, a wheel brake device, and a start control means, which operates the friction clutch to a target rack stroke and adjusts rotation of the engine to a target engine rotational speed when an accelerator pedal depression amount is below a first preset value, and operates the wheel brake device until the engine rotational speed reaches its peak value when the accelerator pedal depression amount is between the first preset value and a second preset value smaller than the first preset value. With this start control means, a vehicle can be smoothly started.

12 Claims, 34 Drawing Sheets

FIG. 7D
FIG. 7E
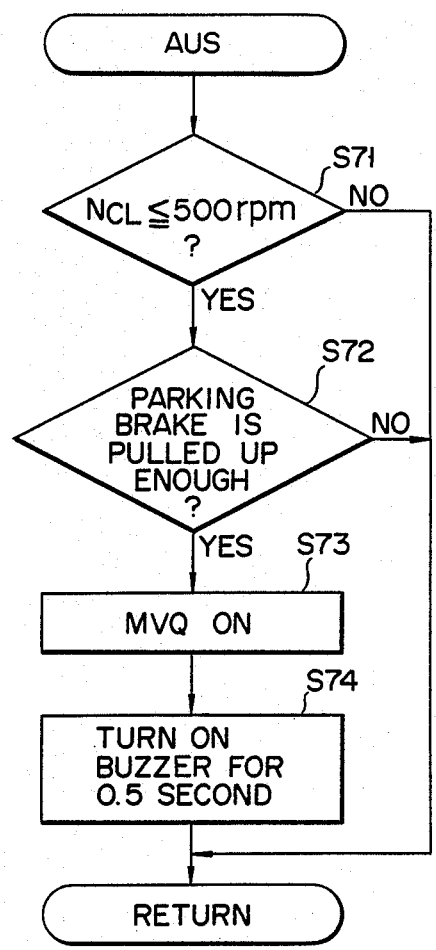
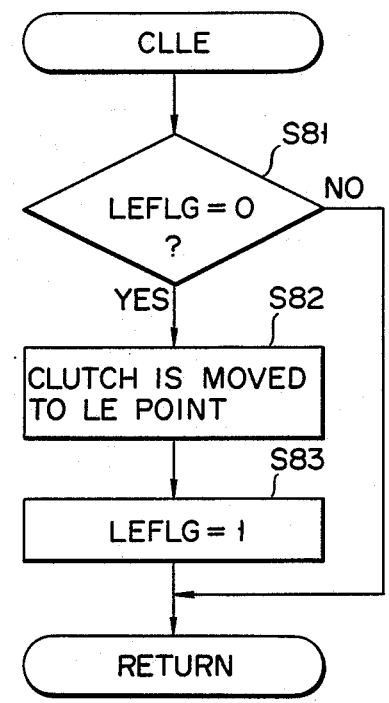

F I G. 10
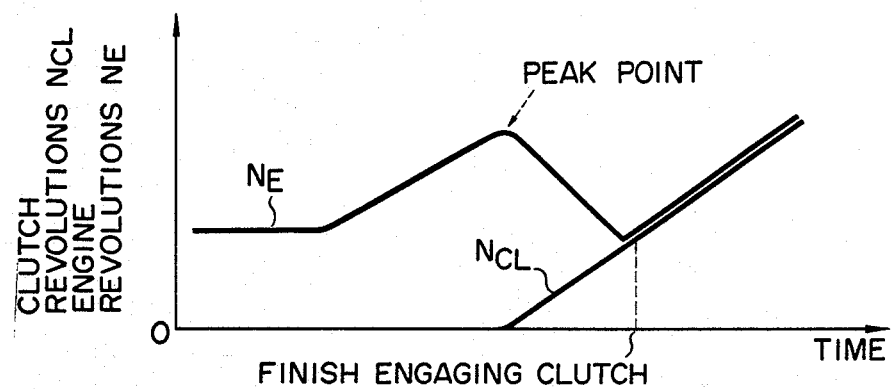
F I G. 11
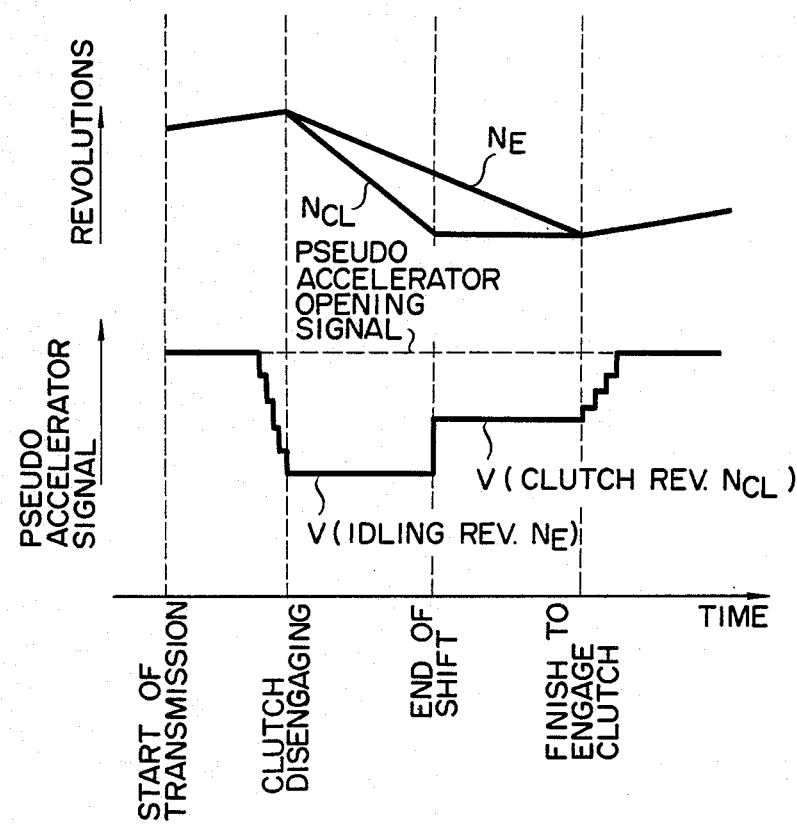

F I G. 15
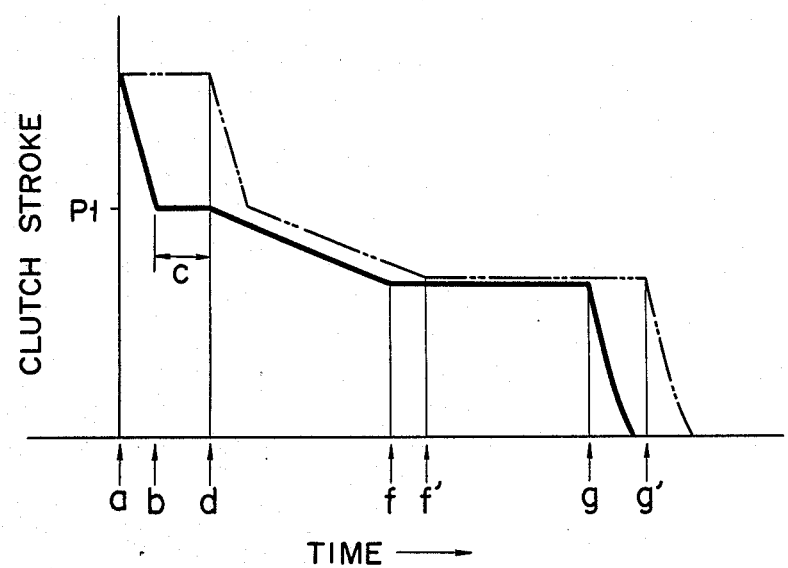
F I G. 16
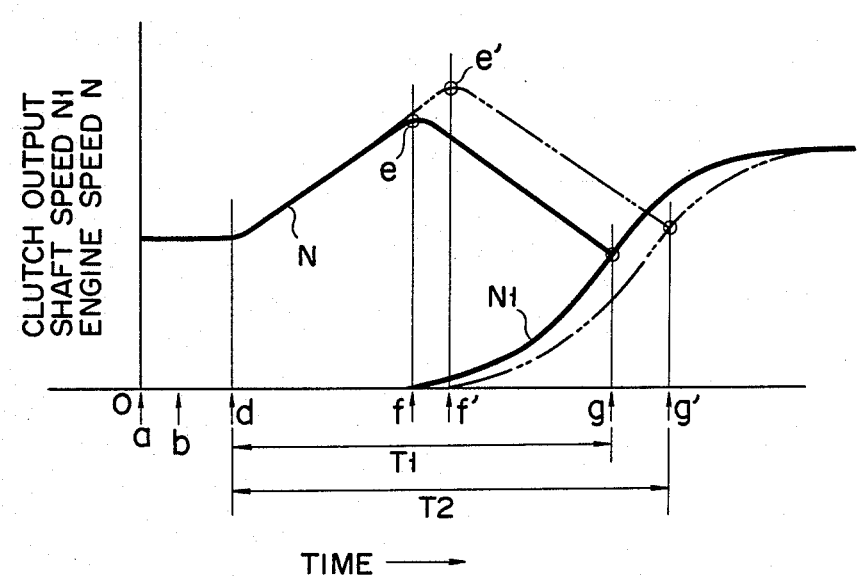

AUTOMATIC TRANSMISSION APPARATUS FOR VEHICLE

This is a continuation of application Ser. No. 846,941 filed Apr. 1, 1986, now abandoned.

BACKGROUND OF THE INVENTION

The present invention relates to an automatic transmission apparatus for a vehicle, which electronically controls a friction clutch interposed between an engine and a parallel shaft type gear transmission through an actuator, and a meshing position of the transmission through a speed ratio switching means.

In recent years, in order to reduce the drive load on operators of large trucks or passenger cars, an automatic transmission apparatus which can automatically select an optimal speed ratio corresponding to vehicle running conditions has been proposed.

A conventional automatic transmission apparatus has been used especially in small passenger cars, and generally comprises a speed ratio switching means for a planetary gear type transmission, in which a liquid joint (e.g., a torque converter) is interposed between an engine and the planetary gear type transmission, and which uses pressurized oil as a control medium.

When an automatic transmission apparatus for a large truck is to be developed, it is important to take the following points into consideration. Since such trucks are manufactured in smaller numbers than passenger cars, development of new torque converters is relatively more expensive.

Therefore, a conventional drive system (e.g., a friction clutch, a parallel shaft type gear transmission, etc.) and equipment for manufacturing it are preferably the same as those for passenger cars.

SUMMARY OF THE INVENTION

An object of the invention is to provide an automatic transmission apparatus for a vehicle which can automatically achieve a smooth transmission operation under electronic control, using a conventional drive system and, more particularly, which can realize smooth start of a vehicle on a slope.

The present invention comprises a load sensor for detecting a load on an engine; a friction clutch connected to an output shaft of said engine; a clutch actuator for operating said friction clutch; a clutch sensor for detecting a position of said friction clutch; a parallel-shaft gear transmission whose input shaft is connected to said friction clutch; speed ratio changing means for changing a speed ratio of said parallel shaft type gear transmission; change speed control means for operating said speed ratio changing means in response to signals from vehicle drive condition detecting means and drive command means; and start control means which actuates said clutch actuator to move said friction clutch to a standby position immediately before a clutch half-engaged state when it is determined that start control is to be initiated in accordance with the speed ratio and an output from said drive condition detecting means, and half-engages said friction clutch when said load sensor detects an increase in load.

BRIEF DESCRIPTION OF THE DRAWINGS

FIG. 7A-1 is a flow chart of a vehicle start processing;

FIG. 7A-2 is a flow chart of a vehicle start processing;

FIG. 7B-1 is a flow chart of a vehicle start processing;

FIG. 7B-2 is a flow chart of a vehicle start processing;

FIG. 7C-1 is a flow chart of a vehicle start processing;

FIG. 7C-2 is a flow chart of a vehicle start processing;

FIG. 7D is a flow chart of an AUS routine;

FIG. 7E is a flow chart of a CELE routine;

FIG. 9A-1 is a flow chart of CHANGE SPEED PROCESSING;

FIG. 9A-2 is a flow chart of CHANGE SPEED PROCESSING;

FIG. 9C-1 is a flow chart of CHANGE SPEED PROCESSING;

FIG. 9C-2 is a flow chart of CHANGE SPEED PROCESSING;

FIG. 9D-1 is a flow chart of CHANGE SPEED PROCESSING;

FIG. 9D-2 is a flow chart of CHANGE SPEED PROCESSING;

FIG. 10 is a graph showing a change in engine speed and clutch rotational speed over time during a transmission operation;

FIG. 11 is a diagram of a shift-up operation;

FIG. 15 is a graph showing a change in clutch stroke over time;

FIG. 16 is a graph showing a change in clutch output put shaft speed N1 over time;

DETAILED DESCRIPTION OF THE PREFERRED EMBODIMENTS

Figure 1:
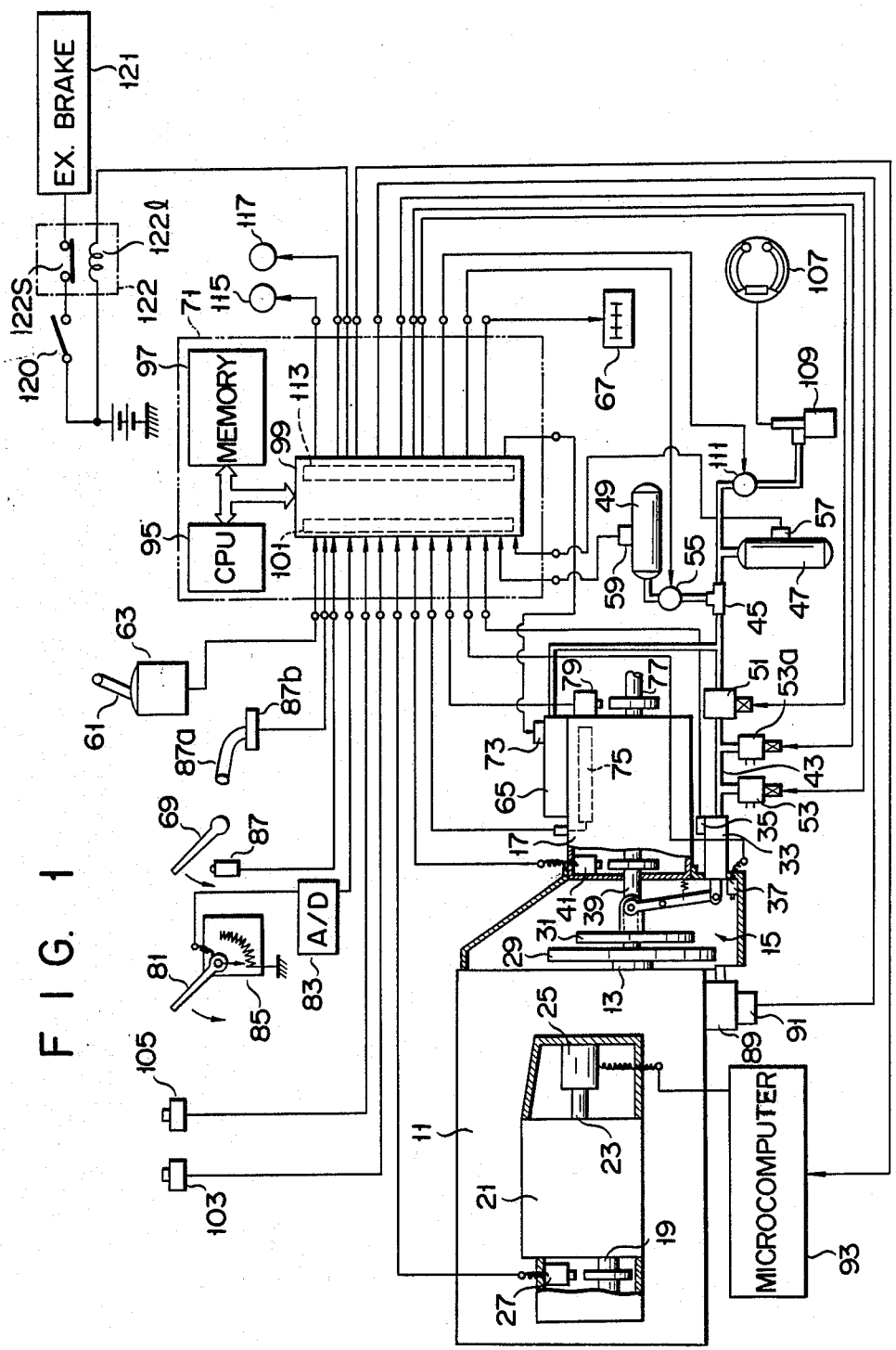
FIG. 1 is a schematic block diagram of an automatic transmission apparatus according to an embodiment of the present invention.

FIG. 1 shows an automatic transmission apparatus according to an embodiment of the present invention. As shown in FIG. 1, n automatic transmission apparatus is mounted over diesel engine (to be referred to simply as "engine" hereinafter) 11 and parallel shaft type gear transmission 17, which receives a rotational force of output shaft 13 of engine 11 through mechanical clutch (to be referred to simply as "clutch" hereinafter) 15. Engine 11 has fuel injection pump (to be referred to simply as "pump" hereinafter) 21 which comprises input shaft 19, rotating at a speed $\frac{1}{2}$ that of output shaft 13. Control rack 23 of pump 21 is coupled to electromagnetic actuator 25, and input shaft 19 thereof is provided with engine speed sensor 27.

Clutch 15 pressure clutch disk 31 against flywheel 29 by a known clamping means (not shown). When air cylinder 33 acting as a clutch actuator is rendered operative from an inoperative state, the clamping means is operated in a release direction, and clutch 15 is shifted from an engaged state to a disengaged state (FIG. 1 illustrates the disengaged state). Clutch 15 has clutch stroke sensor 35 for detecting the disengaged or engaged state of clutch 15 but can have clutch touch sensor 37 instead. Input shaft 39 of transmission 17 has clutch rotational speed sensor 41 for generating a signal indicating a rotational speed of input shaft 39 (to be referred to as a "clutch rotational speed" hereinafter).

Air cylinder 33 communicates with air path 43, and is coupled to a pair of air tanks 47 and 49, acting as high-pressure air sources, through check valve 45. Solenoid valve 51 is a duty-controlled valve similar to solenoid valve 53. To actuate the clutch toward a disengaged side by a predetermined amount, solenoid 51 may be alternately opened and closed by a pulse signal containing a predetermined duty ratio. Solenoid valve 51 opens only when it receives a continuous drive signal from control unit 71 (the time arrival is relatively small). Solenoid valve 53a, which has good responsiveness to a continuous current, is closed only when it receives a drive signal from control unit 71. Solenoid valve 53, which is highly responsive to duty control, is intermittently opened only when it receives a pulse signal, whose duty ratio can be set as desired, from control unit 71. Solenoid valves 51, 53 and 53a operate as hereinafter described with reference to FIGS. 21 to 23. Air tank 49 is for emergency use. When no air remains in main air tank 47, air supply is performed by opening solenoid valve 55. Air tanks 47 and 49 respectively have air sensors 57 and 59 for generating an ON signal when their internal pneumatic pressure is below a preset value.

Figure 2:
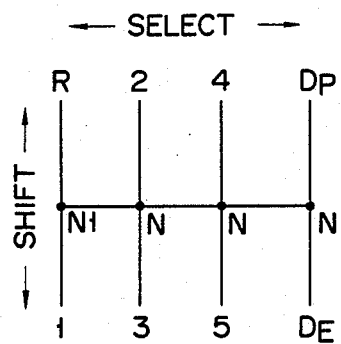
FIG. 2 is an illustration of a shift pattern of the apparatus shown in FIG. 1.

In order to change a speed ratio of transmission 17 for obtaining a target speed ratio, an operator shifts gear shift lever 61 to a desired speed ratio, corresponding to a shift pattern shown in FIG. 2, so as to change speed ratio selection switch 63. Change speed unit 65 as a speed ratio changing means is then operated based on a change speed signal generated by switching switch 63, the transmission is changed to a target speed ratio corresponding to the shift pattern, and the changed speed ratio is displayed on speed ratio indicator 67. Note that reference symbol R indicates a reverse range; N and $N_1$, neutral ranges; 1, 2, 3, 4, and 5, designated speed ratios, and $D_P$ and $DE_E$, automatic speed ratio.

Figure 3A:
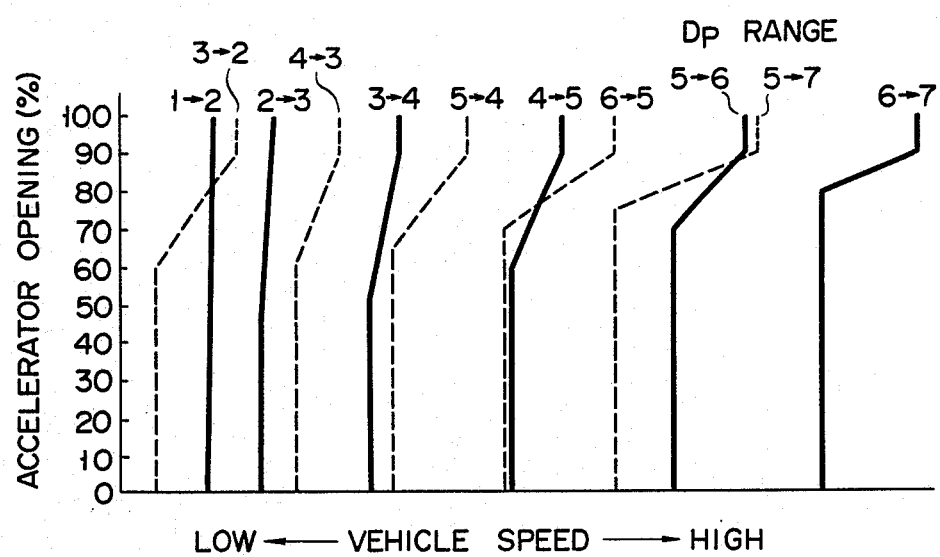
FIG. 3A is a graph of a shift map in the $D_p$ range.
Figure 3B:
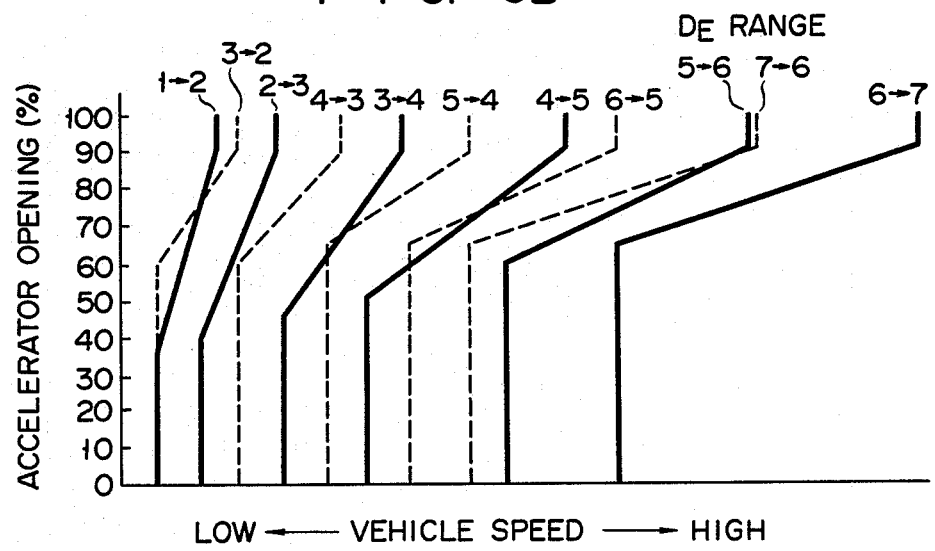
FIG. 3B is a graph of a shift map in the $D_e$ range.

When the $D_P$ or $D_E$ range is selected, one of the 2nd to 7th speeds is automatically determined based on the vehicle running conditions, in accordance with optimal speed ratio determination processing (to be described later). As shown in FIGS. 3A and 3B, respectively showing power automatic speed ratio $D_P$ and economy automatic speed ratio $D_E$, change speed regions vary in shift-up and shift-down modes. Shift timings of the 2nd to 7th speeds of the $D_P$ range are set at higher engine rotating speeds than those of the $D_E$ range in order to cope with a high load state acting on the vehicle. When the driver depresses brake pedal 69, or when he enables exhaust brake 121, different shift maps which are programmed corresponding thereto are selected, and three shift maps each are prepared for ranges $D_P$ and $D_E$.

Change speed unit 65 comprises a plurality of solenoid valves 73 (only one is shown in FIG. 1), which are actuated by an actuation signal from control unit 71, and a pair of power cylinders (not shown), which receive highly compressed actuation air from air tank 47 (or 49) through valves 73 to actuate select and shift forks (neither are shown). Unit 65 operates the power cylinders in response to the actuation signal supplied to valve 73, thus changing a speed ratio of transmission 17 in the select and shift directions. In addition, unit 65 comprises speed ratio switch 75, which acts as a speed ratio sensor for detecting the respective speed ratio, and which supplies a speed ratio signal to control unit 71.

Output shaft 77 of transmission 17 has vehicle speed sensor 79 for generating a vehicle speed signal. Accelerator pedal 81 has accelerator load sensor 85, which changes its resistance to correspond with a depression amount of pedal 81 to produce a voltage signal, which is then converted by A/D converter 83 into a digital signal. Brake pedal 69 has brake sensor 87 which generates an H-level brake signal when pedal 69 is depressed. Engine 11 has starter 89 which is appropriately meshed with a peripheral ring gear of flywheel 29 to start engine 11. Starter relay 91 of starter 89 is connected to control unit 71.

Note that reference numeral 93 denotes a microcomputer, which performs various control procedures for the vehicle in addition to control unit 71 (e.g., it receives input signals from respective sensors to perform drive control and the like). Microcomputer 93 supplies the actuation signal to actuator 25 of pump 21 to control an increase or decrease in rotational speed of output shaft 13 (to be referred to as engine speed hereinafter) of engine 11 by increasing or decreasing fuel supply. In other words, the engine speed is increased or decreased in accordance with the output signal (acting as an engine speed increase/decrease signal) from control unit 71.

Control unit 71 is a special-purpose microcomputer for the automatic transmission apparatus, which comprises microprocessor (to be referred to as CPU hereinafter) 95, memory 97, and interface 99 acting as an input signal processor. Input port 101 of interface 99 receives the output signals from the following sensors and switches: speed ratio selection switch 63; brake sensor 87b; parking brake sensor 76 for generating a parking-brake signal ,when parking brake 87a of the vehicle is operated; accelerator load sensor 85; engine speed sensor 27; clutch rotational speed sensor 41; speed ratio switch 75; vehicle speed sensor 79; clutch touch sensor 37 (used instead of clutch stroke sensor 35 when the disengaged or engaged state of clutch 15 is to be detected); air sensors 57 and 59; slope-start support switch 103 (to be described below); and 1st-speed start switch 105.

Switch 103 operates a system for preventing reverse movement of the vehicle when the vehicle is started on a slope (the system to be referred to as an AUS hereinafter). More specifically, the vehicle is started while controlling air supply to air master 109 of wheel brake 107 through solenoid valve (to be referred to as MVQ hereafter) 111, which is controlled by control unit 71. 1st-speed start switch 105 allows a 1st-speed start mode to be automatically executed in the $D_P$ or $D_E$ range. Output port 113 is connected to microcomputer 93, starter relay 91, solenoid valves 53 and 73, MVQ 111, and cut valve 51, and can supply an output signal thereto.

Reference numeral 115 denotes an air warning lamp which is turned on in response to an output from a drive circuit (not shown) when the pneumatic pressure in air tanks 47 and 49 does not reach a preset value; and 117, a clutch warning lamp which is turned on in response to the output therefrom when wear amount of clutch 15 exceeds a preset value. Reference numeral 120 denotes an exhaust brake switch for operating exhaust brake device 121; and 122, a exhaust brake release relay for inhibiting the operation of device 121. More specifically, when relay coil 122l of relay 122 is energized by a signal from control unit 71, normally closed switch 122s is opened to inhibit the operation of device 121.

Figure 4:
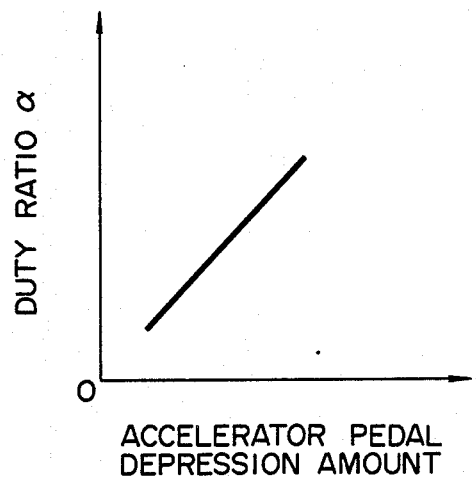
FIG. 4 is a graph of a map for determining a duty ratio.

Memory 97 comprises a read-only memory (ROM) storing a program and data shown by flow charts in FIGS. 5 to 9, and a read/write random-access memory (RAM). More specifically, the ROM stores duty ratio α of solenoid valve 53 corresponding to the accelerator load signal, in addition to the program in the form of a map, shown in FIG. 4, and a corresponding value is read out by referring to this map as needed. Switch 63 generates select and shift signals as a change speed signal. In this case, speed ratio positions corresponding to combinations of the select and shift signals are prestored in the form of a data map, and when the select and shift signals are received, a corresponding output signal is supplied to solenoid valves 73 of change speed unit 65 by referring to this map, thus adjusting the speed ratio to the target speed ratio corresponding to the change speed signal. In this case, the speed ratio signal from switch 75 is produced upon completion of the change speed operation, and is used to check if all the speed ratio signals corresponding to the combinations of the select and shift signals are generated, so as to generate a normal or abnormal meshing signal. Furthermore, the ROM also stores the shift maps shown in FIGS. 3A and 3B for determining an optimal speed ratio based on vehicle speed, accelerator load, and engine speed signals in the $D_P$ or $D_E$ range.

The change speed control sequence of this embodiment will now be described with reference to FIGS. 5 to 9.

Figure 5:
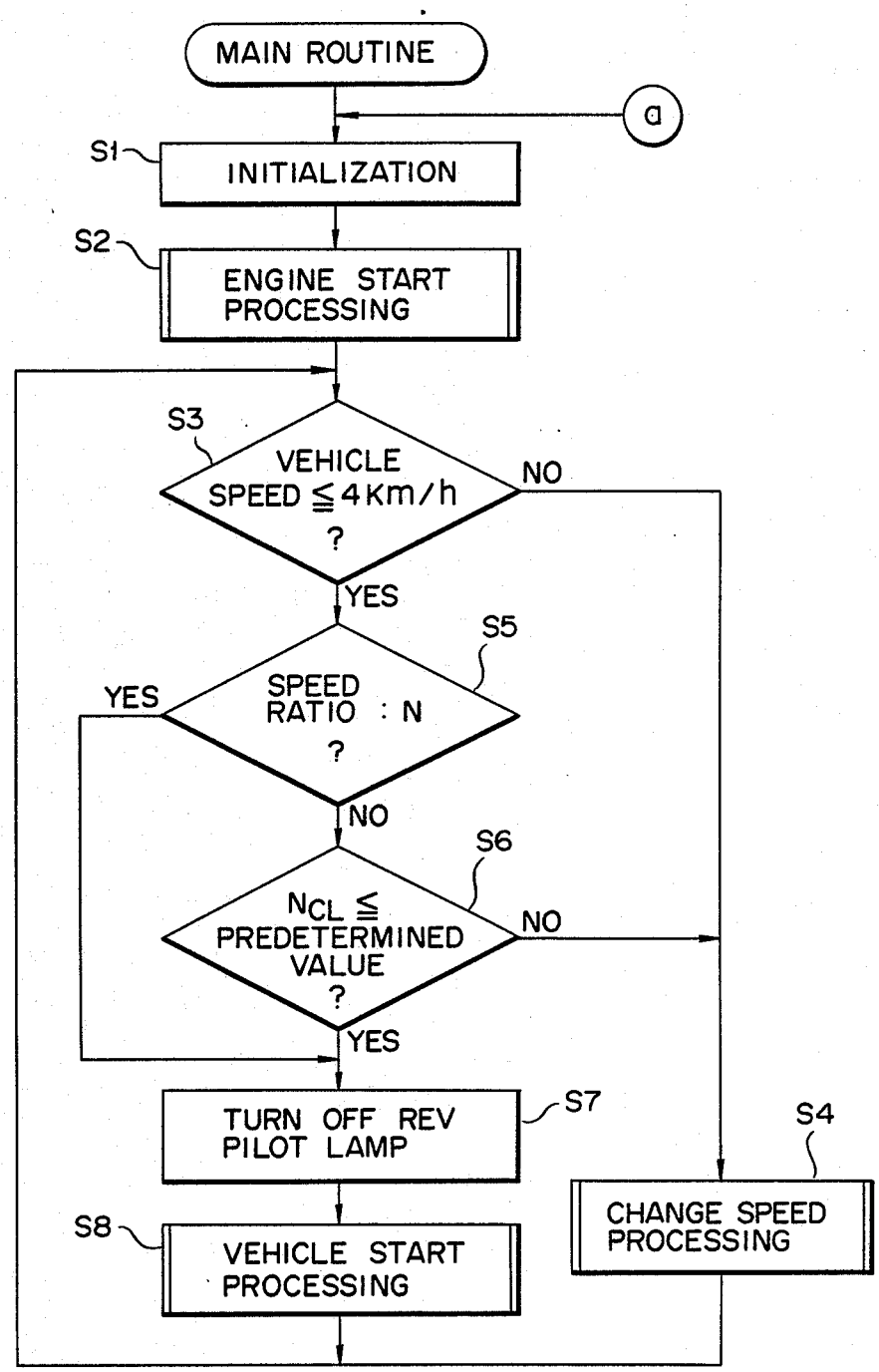
FIG. 5 is a flow chart of a main routine.

After the program starts as shown in FIG. 5, initialization is performed wherein the memories are cleared, and if clutch 15 is engaged at a normal pressure in a normal state, dummy data for a standby position immediately before a half-engaged clutch position (to be referred to as an LE point hereinafter) at which driving wheels are shifted from a rotating state to a stop state when clutch 15 is disengaged from the engaged position to a certain extent, is fetched (step S1). The flow enters engine start processing (step S2), and the CPU receives the vehicle speed signal and clutch rotational speed signal. If a value of the vehicle speed signal exceeds 4 km/h (step S3), the flow enters change speed processing (step S4), and if 4 km/h or less, it is checked in step S5 if the speed ratio is in the neutral (N) range. If YES in step S5, an REV pilot lamp (not shown) for indicating the reverse mode is turned off (step S7), and the flow enters vehicle start processing (step S8). However, if NO in step S5, it is checked if clutch rotational speed $N_{CL}$ is below a predetermined value (step S6). If YES in step S6, the REV pilot lamp is turned off (step S7), and the vehicle start processing is performed (step S8). If NO in step S6, the change speed processing (step S4) is performed.

Figure 6A:
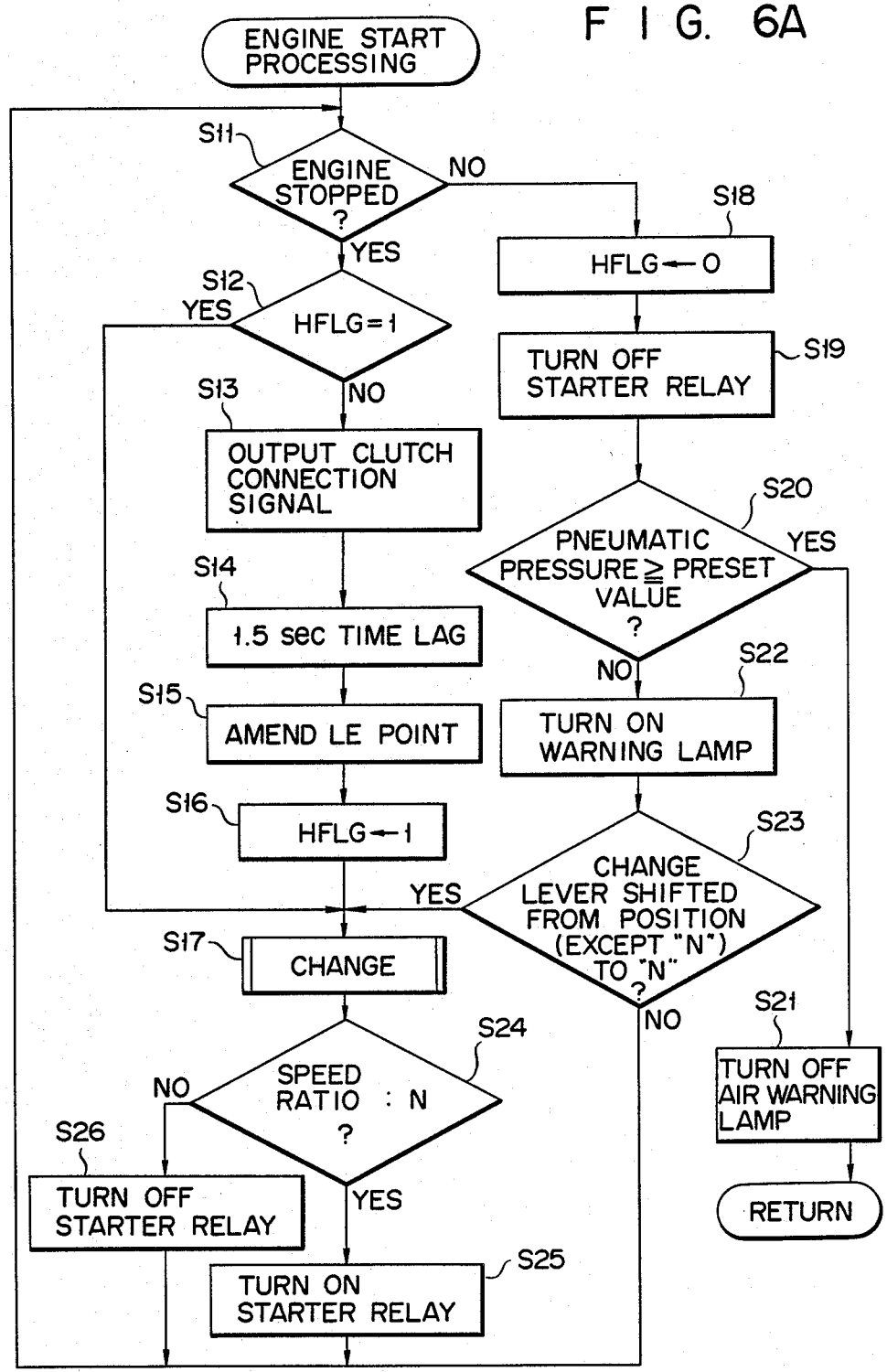
FIG. 6A is a flow chart of engine start processing.
Figure 6B:
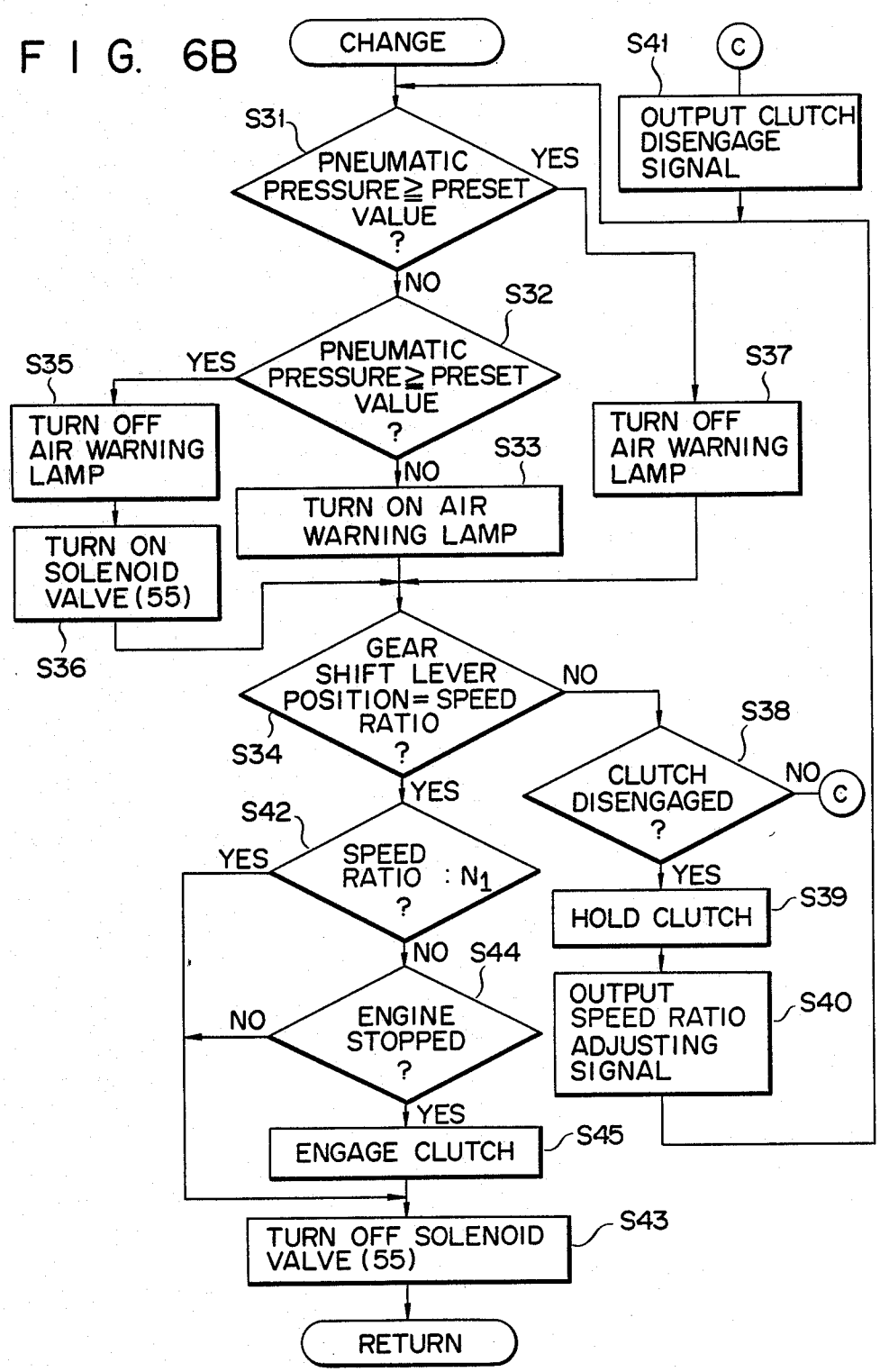
FIG. 6B is a flow chart of a change routine.

In the engine start processing shown in FIGS. 6A and 6B, a signal for engine speed $N_E$ is received to check if speed $N_E$ falls within a stop region of engine 11 (step S11). If YES in step S11, it is checked in step S12 if LE point correction is performed in accordance with a wear state of a facing of clutch 15 or the load/unload of a cargo when the engine starts. More specifically, if flag HFLG=1 in step S12, it is determined that LE point correction is performed. When LE point correction is performed, a stroke of clutch disk 31 from the LE point to a fully engaged position of clutch 15 can always be constant, and clutch 15 can be engaged smoothly irrespective of the vehicle conditions. If NO in step S12, a clutch connection signal is generated (step S13), and after a 1.5-sec delay time (step S14), LE point correction is performed. Next, flag HFLG is set to be 1 (step S16), and the flow enters a CHANGE routine (step S17). If YES in steps S11 and S12, the flow enters the CHANGE routine (step S17) directly. However, if NO in step S11, flag HFLG is cleared (step S18), and, a starter enable relay (not shown) is turned off (step S19). It is then checked in step S20 if the pneumatic pressures in air tanks 47 and 49 reach the preset value. If YES in step S20, air warning lamp 115 is turned off, thus completing the engine start processing (step S21). However, if NO in step S20, lamp 115 is turned on (step S22), and it is checked in step S23 if gear shift lever 61 is shifted in the N range from a position other than the N range. If YES in step S23, the flow enters the CHANGE routine (step S17); otherwise, the flow returns to step S11 to check if engine speed $N_E$ falls in the stop region of engine 11.

In the CHANGE routine, as shown in FIG. 6B, it is checked in step S31 if the pneumatic pressure in main air tank 47 has reached the preset value. If NO in step S31, it is checked in step S32 if the pneumatic pressure in emergency air tank 49 has reached the preset value. If NO in step S32, air warning lamp 115 is turned on (step S33) to signal the operator that the pneumatic pressures in tanks 47 and 49 are below the preset value. Furthermore it is checked in step S34 if a position of gear shift lever 61 coincides with a current speed ratio, i.e., if the change speed signal coincides with the speed ratio signal and the speed ratio of the transmission 17 change a target designated by the change speed signal (if the $D_E$ or $D_P$ range is selected, the 2nd speed is set in advance). However, if YES in step S32, lamp 115 is turned off (step S35), and solenoid valve 55 of air tank 49 is turned on (step S36). Thereafter, it is checked in step S34 if the position of gear shift lever 61 coincides with the speed ratio. However, if YES in step S31, lamp 115 is turned off (step S37), and step S34 is executed. If NO in step S34, it is checked in step S38 if clutch 15 is disengaged. If YES in step S38, the pneumatic pressure of clutch 15 is held at the current value (step S39), and a signal for adjusting the speed ratio corresponding to the position of lever 61 is generated (step S40). Thereafter, it is again checked in step S31 if the pneumatic pressure in air tank 47 is at the preset value. If NO in step S38, the clutch disengage signal is generated (step S41), and it is checked in step S31 if the pneumatic pressure in air tank 47 is at the preset value. Meanwhile, if YES in step S34, it is checked in step S42 if the speed ratio is in the neutral range $N_1$. If YES in step S42, solenoid valve 55 is turned off (step S43), and the flow returns to the main routine. If NO in step S42, it is checked in step S44 if engine 11 is stopped, and if YES in step S44, clutch 15 is engaged (step S45), solenoid valve 55 is turned off, and the flow then returns. If NO in step S44, solenoid valve 55 is turned off (step S43), and the flow returns.

After the CHANGE routine is completed, it is checked in step S24 if the speed ratio is in the N range. If YES in step S24, the starter enable relay is turned on (step S25), and it is checked if engine speed $N_E$ falls within the stop region of engine 11 (step S11). If NO in step S24, the starter enabling relay is turned off (step S26), and the flow returns to step S11.

After the engine start processing is completed, the vehicle speed signal and the clutch rotational speed signal are fetched, and when these are below the preset values, the control flow enters the vehicle start processing.

Figures 1, 7A:
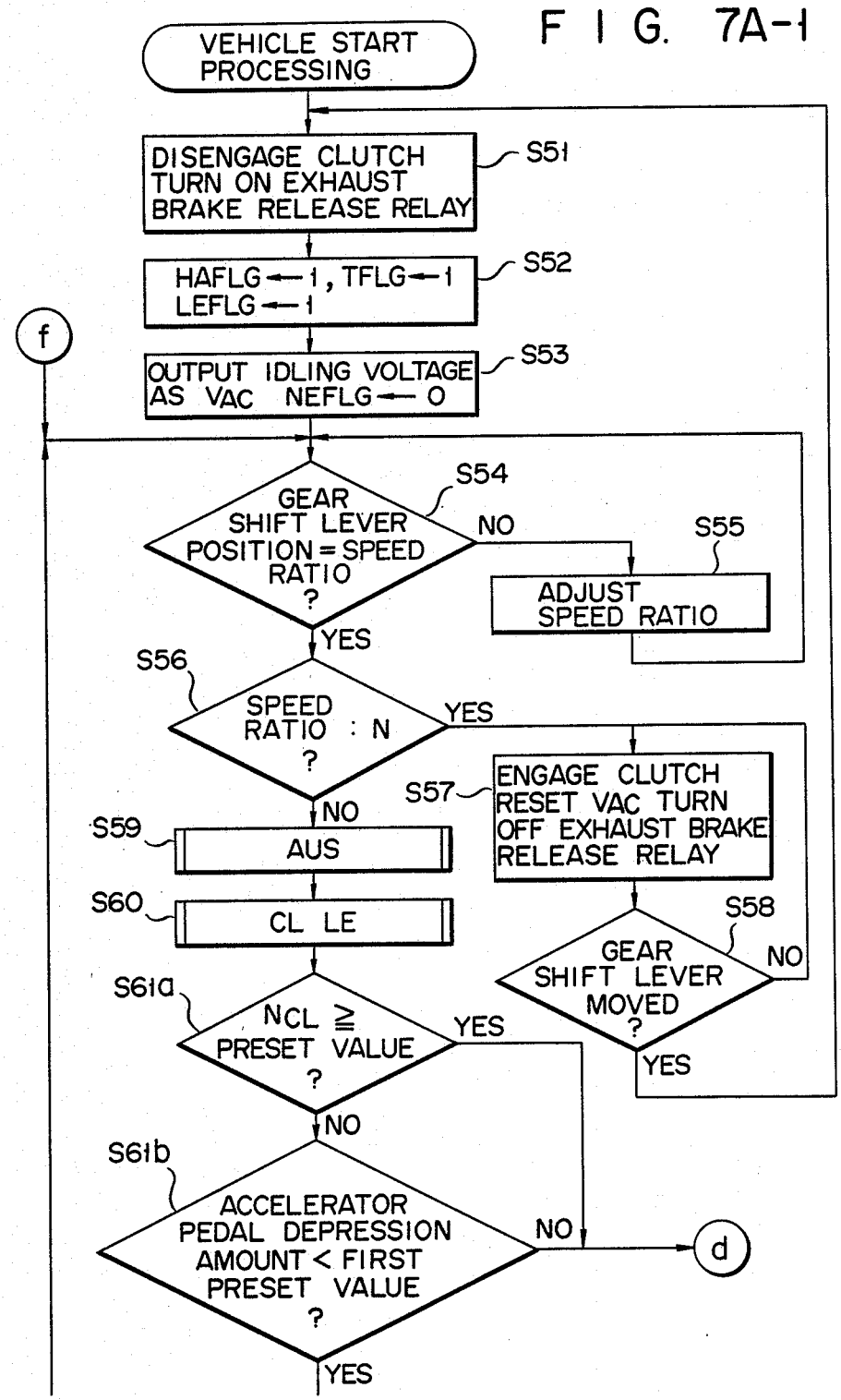
Figures 2, 7A:
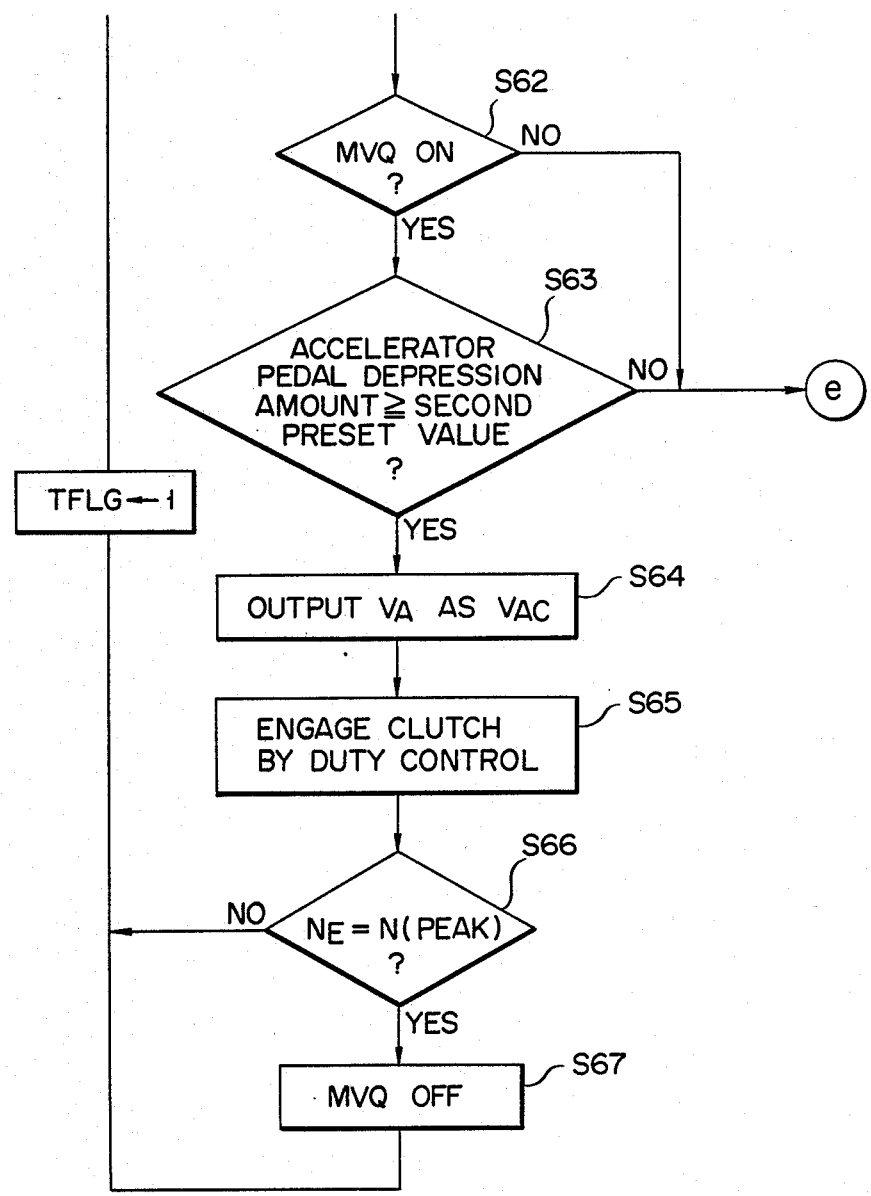

As shown in FIG. 7A, clutch 15 i disengaged, and an exhaust brake release relay 122 is turned on (step S51). Flags HAFLG, TFLG, and LEFLG are set to be 1 (step S52), and an idling voltage for rotating engine 11 in an idling mode is supplied to an electronic governor as pseudo-accelerator signal voltage $V_{AC}$ and flag NEFLG is cleared (step S53). When the vehicle is in a start standby state, the exhaust brake release relay 122 is turned on, so that exhaust brake device 121 is rendered inoperative. Thus, even if a switch 120 for operating the exhaust brake device 121 is turned on, the exhaust brake can no longer be operated. Next, it is checked in step S54 if the position of gear shift lever 61 coincides with the speed ratio, and if NO in step S54, the signal for adjusting the speed ratio corresponding to the position of lever 61 is produced to coincide them with each other (step S55). If YES in step S54, it is checked in step S56 if the speed ratio is at the N position. If YES in step S56, clutch 15 is engaged and voltage $V_{AC}$ is cancelled, and the exhaust brake release relay 122 is turned off (step S57). Thereafter, it is checked in step S58 if lever 61 is shifted to another position. If YES in step S58, the above processing is repeated. If NO in step S56, the flow enters slope-start support routine AUS (step S59).

In the AUS routine shown in FIG. 7D, if clutch rotational speed $N_{CL}$ is below 500 rpm (step S71) and parking brake 87a is pulled up to apply a sufficient braking force to the vehicle (step S72), MVQ 111 is turned on (step S73), a buzzer (not shown) is turned on for 0.5 sec, and wheel brake 107 is actuated to apply the braking force (step S74). The buzzer is turned on in order to inform the driver that the auxiliary brake is actuated when the vehicle starts to ascend a slope. However, if clutch rotational speed $N_{CL}$ exceeds 500 pm or parking brake 87a is not pulled up sufficiently, the control returns to the main routine without turning on MVQ 111.

After the AUS routine is completed, the flow enters a CLLE routine shown in FIG. 7E (step S60), and clutch 15 is moved to the LE point. In the CLLE routine, it is checked in step S81 if flag LEFLG, indicating that clutch 15 is moved to the LE point, is cleared. If NO in step S81, since clutch 15 is moved to the LE point, the flow returns to the main routine. However if YES in step S81, clutch 15 is moved to the LE point (step S82), flag LEFLG is set to be 1 (step S83), and the flow then returns.

After the CLLE routine, it is checked in step S61a if clutch rotational speed $N_{CL}$ exceeds the preset value, and if NO in step S61a, it is checked in step S61b if a depression amount of accelerator pedal 81 is below a first preset value (e.g., 50%). If the depression amount of pedal 81 exceeds the first preset value or clutch rotational speed $N_{CL}$ also exceeds the preset value, the flow advances to start control processing routine d. However, if the depression amount of pedal 81 is below the first preset value, it is checked in step S62 if MVQ 111 is turned on. If YES in step S62, it is checked in step S63 if the depression amount of pedal 81 exceeds a second preset value (e.g., 10%) smaller than the first preset value. If NO in steps S62 and S63, the flow advances to slow-start control processing routine e. If YES in step S63, $V_A$ is supplied as signal $V_{AC}$ and clutch 15 is engaged under the duty control (step S65). Engine speed $N_E$ then reaches a peak point occurring when rotation of output shaft 13 of engine 11 begins to be transmitted to the driving wheel side as the rotation of input shaft 39 of transmission 17 through clutch 15. Thus, it is checked in step S66 if engine speed is enough to execute the slope-start mode, i.e., if engine speed $N_E$ is at its peak value N(PEAK). If YES in step S66, MVQ 111 is turned off, and the AUS is disabled (step S67). However, if NO in step S66, MVQ 111 is maintained ON until speed $N_E$ reaches its peak value.

With the above processing, the vehicle can be prevented from being moved backward and can be started slowly. Basically, when the accelerator pedal depression amount is below the first preset value, the slow-start control is performed. However, when the vehicle is located on a slope facing uphill, the operator tends to depress pedal 81 more than normal if he intends to start the vehicle slowly. Thus, when the accelerator pedal depression amount is between the first and second preset values, the slow-start control is executed after the slope-start support control. More specifically, excluding a case wherein MVQ 111 is not ON and the AUS is already disabled, if the accelerator pedal depression amount exceeds the second preset value, MVQ 111 is turned off, the AUS is disabled when engine speed $N_E$ has reached its peak value, and clutch 15 is engaged to a certain extent, so that the vehicle no longer moves downhill on the slope. Thereafter, as shown in the flow charts, the above processing is repeated. In this case, since MVQ 111 is turned off (step S62), the flow enters slow-start control routine e. Therefore, the vehicle can be smoothly and slowly started on the slope.

Figures 1, 7B:
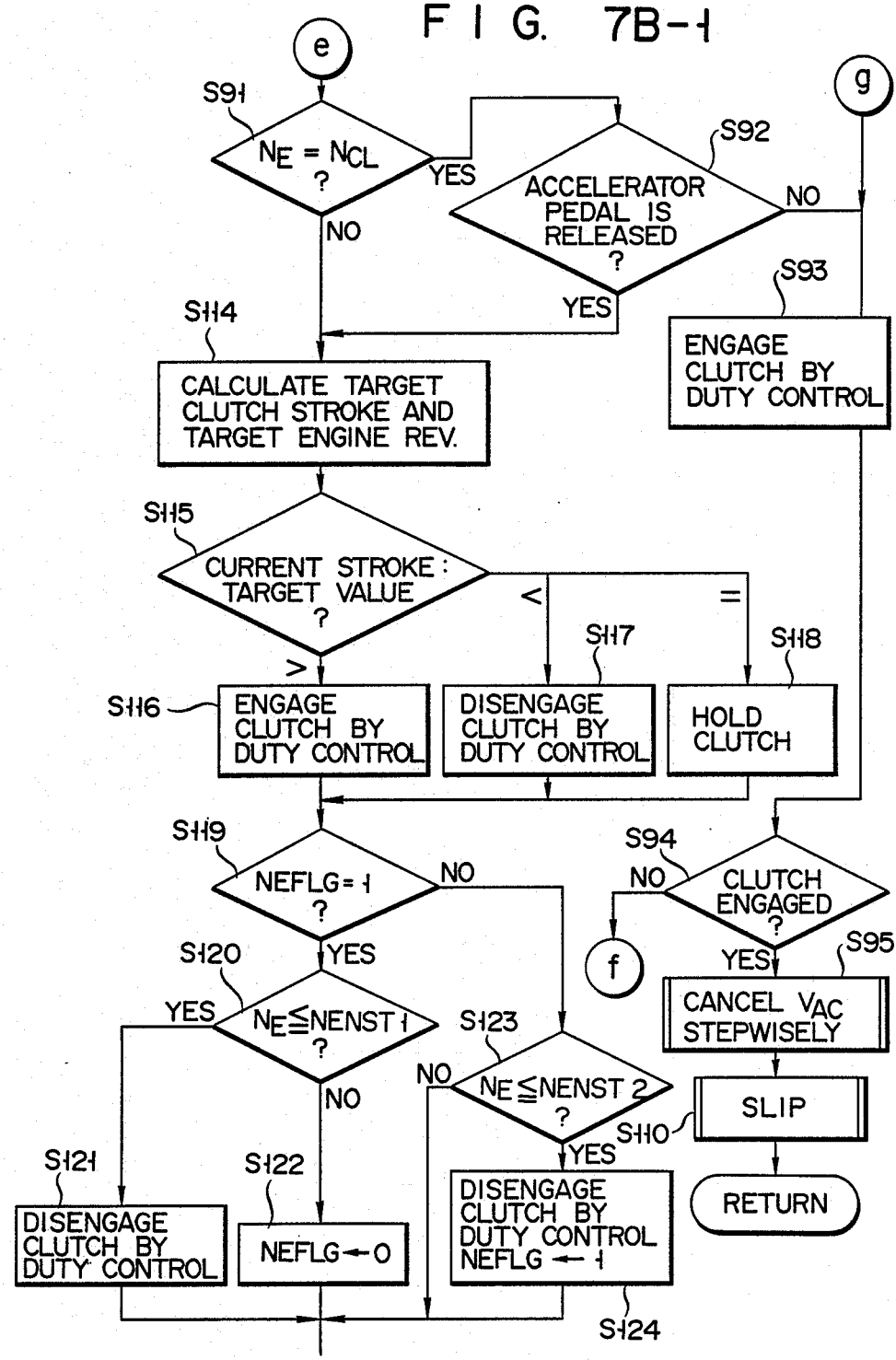
Figures 2, 7B:
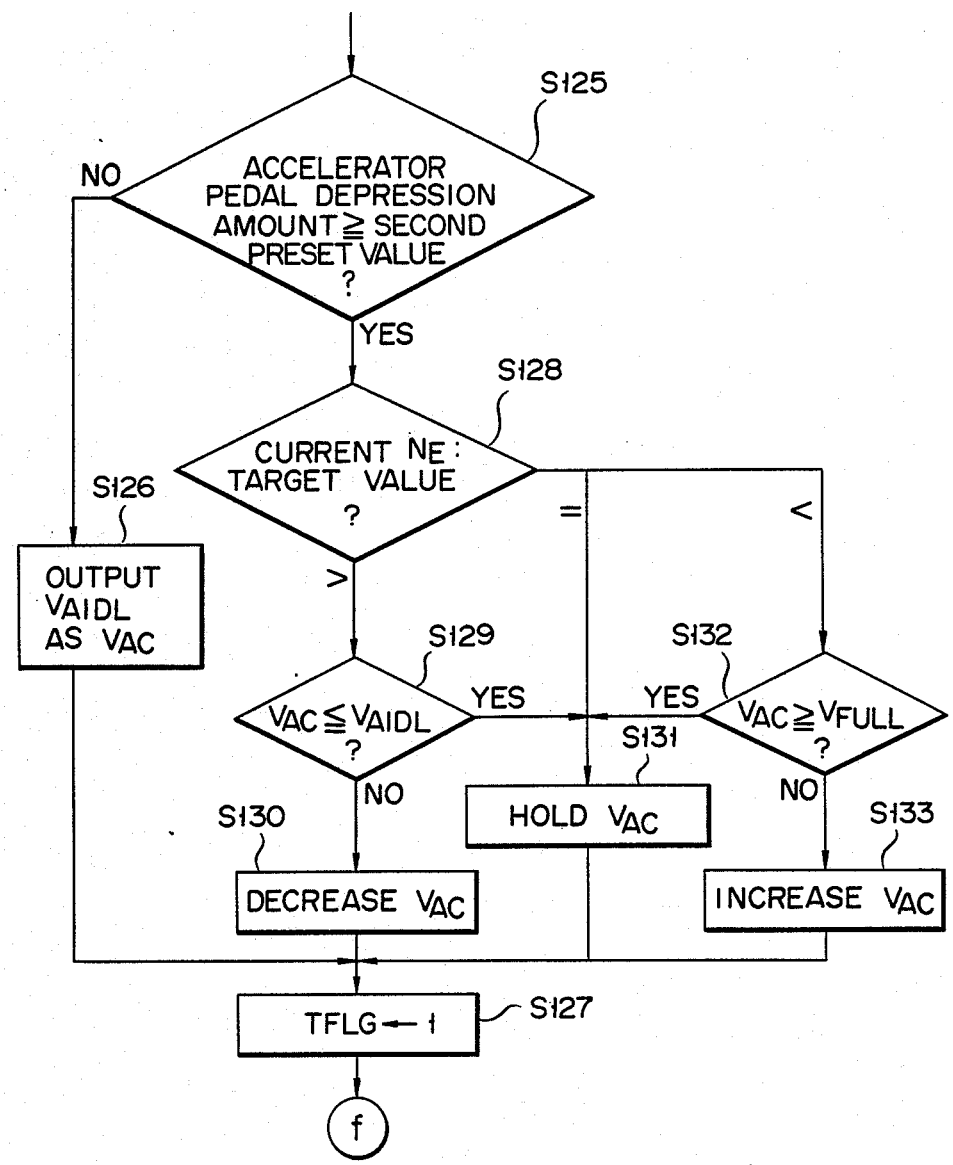
Figures 1, 7C:
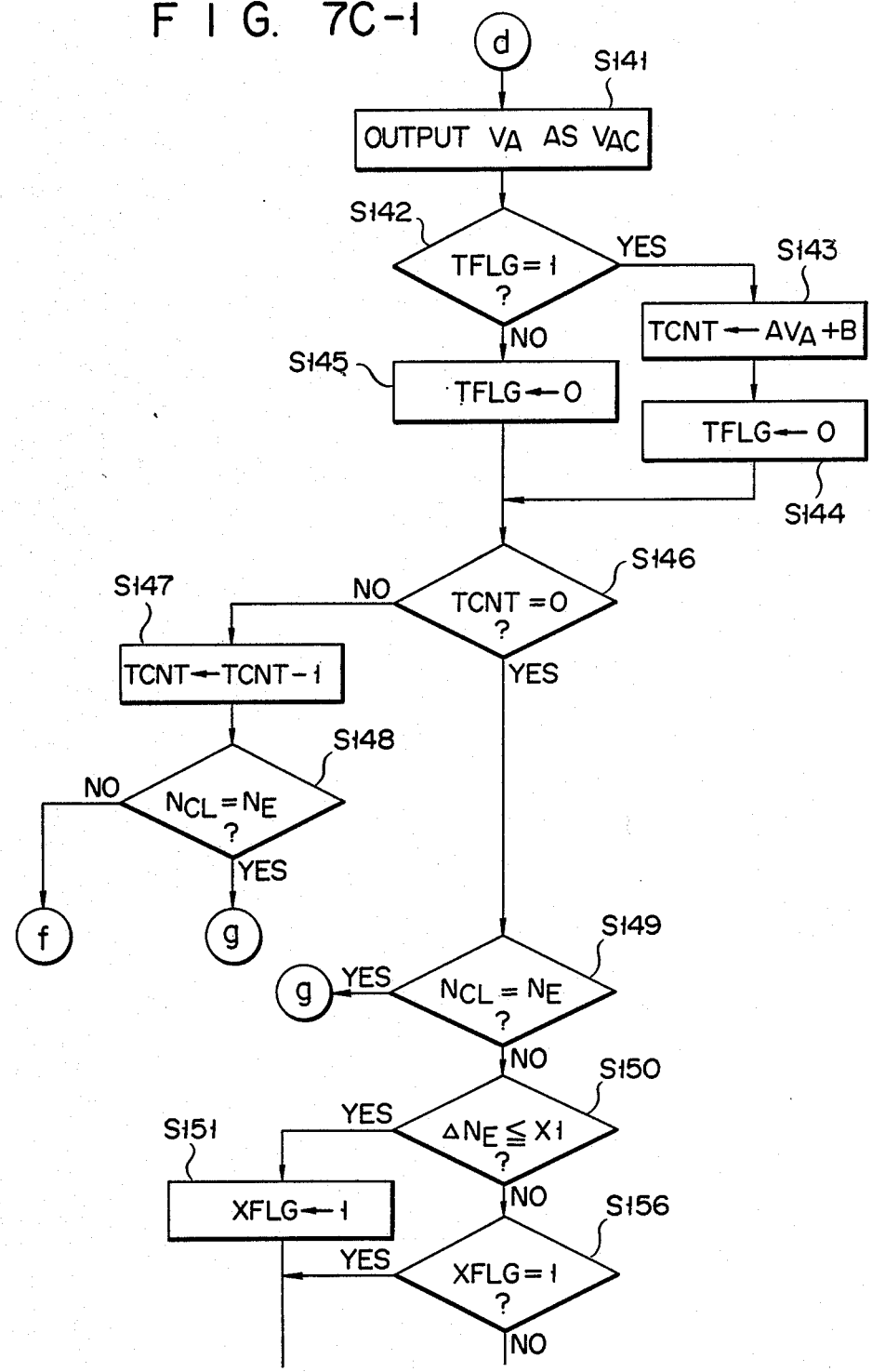
Figures 2, 7C:
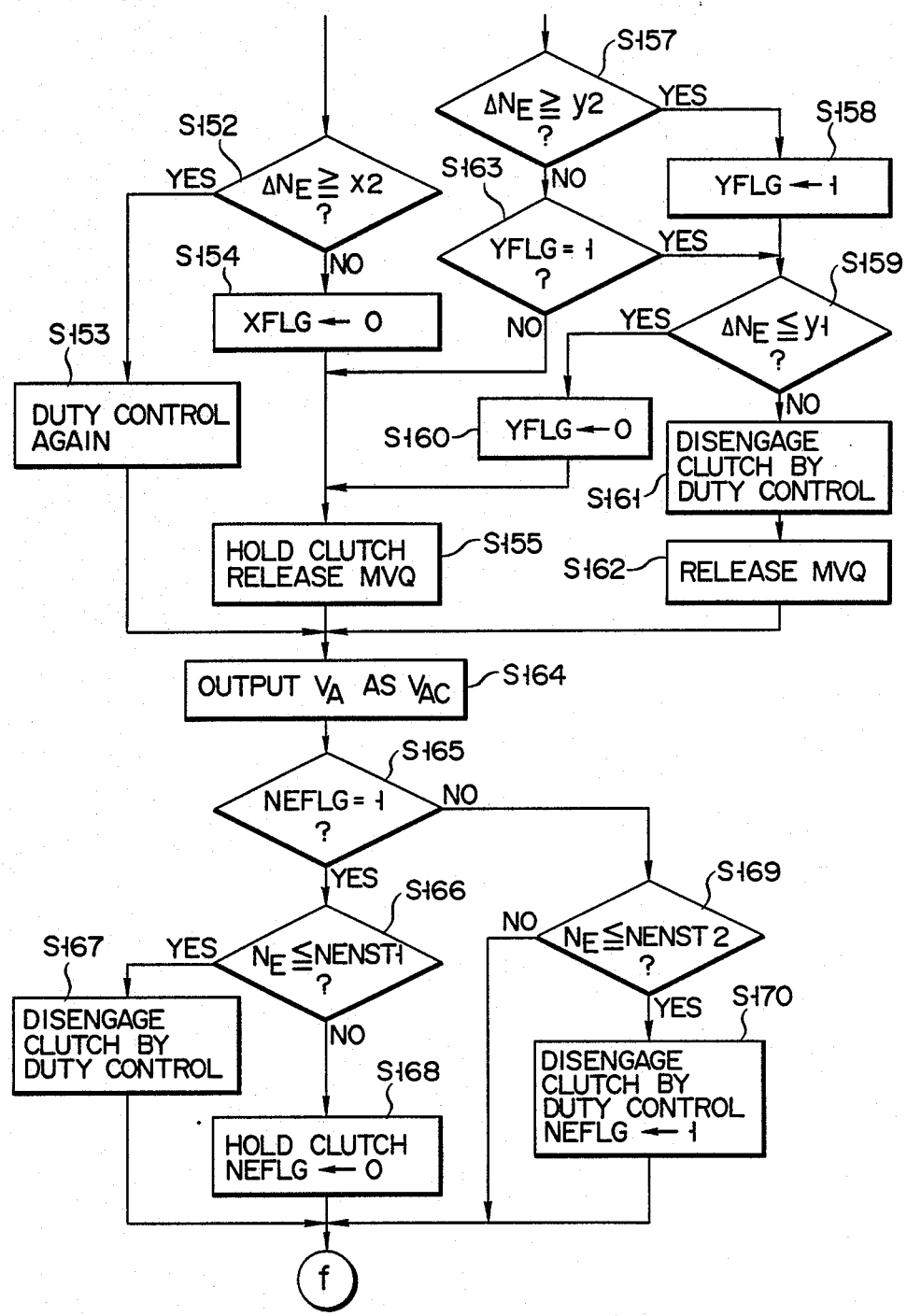

When it is determined that the accelerator pedal depression amount is below the second preset value and the flow enters the slow-start control routine e shown in FIG. 7B, it is checked in step S91 if the rotation of clutch 15 is synchronized with that of engine 11. If YES in step S91, it is checked in step S92 if the operator has released accelerator pedal 81, i.e., whether he intends to gradually start the vehicle while he maintains pedal 81 at a constant angle, or whether he repetitively depresses and releases pedal 81 to start the vehicle slowly. If NO in step S92, clutch 15 is gradually engaged under the duty control (step S93), and after YES is obtained in step S94, the flow enters a $V_{AC}$ stepwise-cancelling routine for stepwise cancelling of pseudo-accelerator signal voltage $V_{AC}$ (step S95).

Figure 7F:
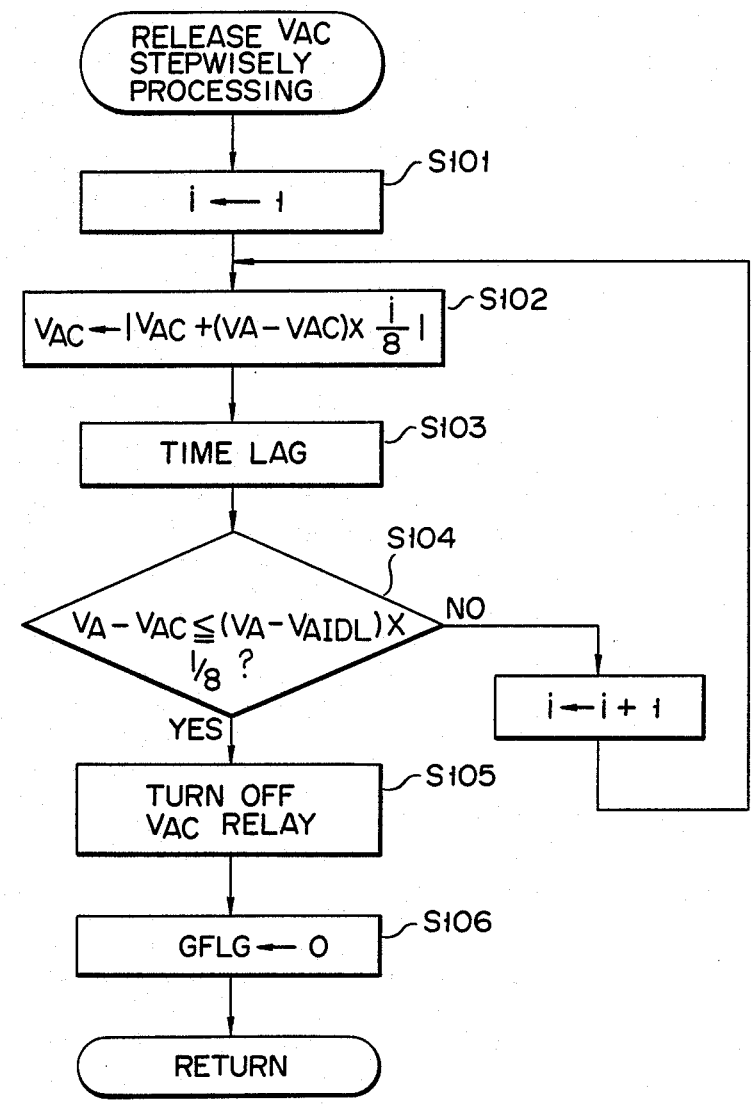
FIG. 7F is a flow chart of RELEASE $V_{AC}$ STEPWISE PROCESSING.

In this routine, as shown in FIG. 7F, accelerator load signal voltage $V_A$ after clutch 15 has been engaged is fetched, and pseudo-accelerator signal voltage $V_{AC}$ is increased for a predetermined period of time by $\frac{1}{8}$th the difference between voltages $V_A$ and $V_{AC}$ (step S102). After repeating this operation, when a difference between new voltage $V_A$ and new voltage $V_{AC}$ is smaller than $\frac{1}{8}$th the value obtained by subtracting from new voltage $V_A$ voltage $V_{AIDL}$ acting on actuator 25 at a position of control rack 23 corresponding to idling rotation of engine 11 (step S104), the pseudo-accelerator signal voltage is cancelled (steps S105 and S106), and the flow returns to the main routine. In this way, when an output signal to actuator 25 is increased not immediately but stepwise up to voltage $V_A$, uncomfortable jolting of the operator can be eliminated. After cancelling voltage $V_{AC}$ stepwise, a slip routine (step S110) for calculating a wear amount of clutch 15 is performed, thus completing the vehicle start processing.

Figure 7G:
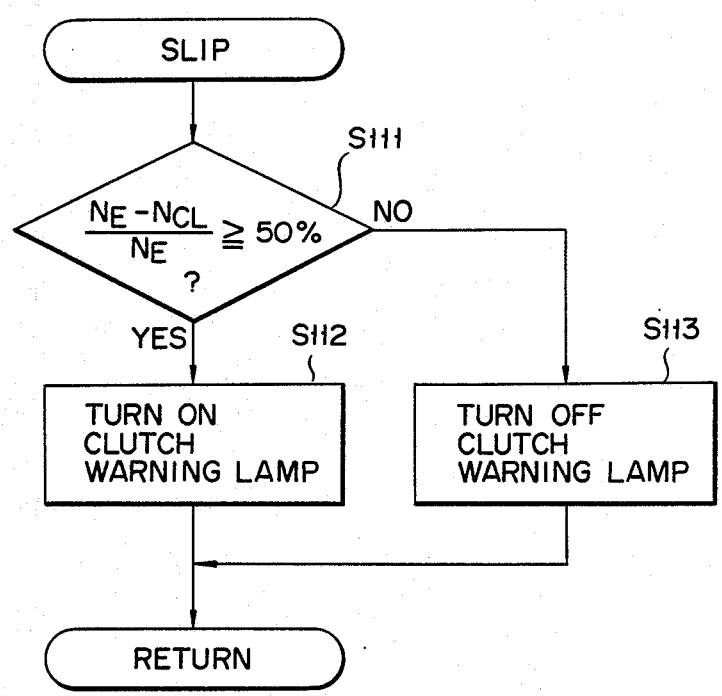
FIG. 7G is a flow chart of a SLIP routine.

In this slip routine, as shown in FIG. 7G, it is checked in step S111 if a value yielded from {(engine speed $N_E$—clutch rotational speed $N_{CL}$)/engine speed $NE_E$} is 50% or higher. If YES in step S111, clutch warning lamp 117 is turned on (step S112), and the flow returns. However, if NO In step S111, lamp 117 is turned off (step S113), and the flow then returns. Note that before voltage $V_{AC}$ is cancelled stepwise, it is checked in step S94 if clutch 15 is engaged, and if NO in step S94, control is restarted from initial stage f of the vehicle start processing.

Meanwhile, if NO in step S91, or if YES in step S92, a target clutch stroke and a target engine speed are calculated based on preset data in order to start the vehicle slowly (step S114). The current stroke of clutch 15 is compared with the calculated target value (step S115) to determine whether clutch 15 is engaged under the duty control (step S116), whether it is disengaged under the duty control (step S117), or whether it is fixed in position at the current stroke (step S118), thus coinciding the current stroke of clutch 15 to the target value. Duty control is to control ON time of the solenoid valve (51, 53) in one cycle. It is then checked in step S119 if flag NEFLG indicating that engine speed $N_E$ is below 400 rpm is 1. If YES in step S119, it is checked in step S120 if engine speed $N_E$ is lower than first engine-stop prevention speed NENST1. If YES in step S120, clutch 15 is disengaged under the duty control (step S121); otherwise, flag NEFLG is cleared (step S122). Thereafter, the flow advances to accelerator pedal depression amount control. However, if NO in step S119, it is checked in step S123 if engine speed $N_E$ is lower than second engine-stop prevention speed NENST2, which is lower than speed NENST1. If YES in step S123, clutch 15 is disengaged under the duty control (step S124), and flag NEFLG is set to be 1. However, if NO in step S123, the flow enters the accelerator pedal depression amount control.

In this control, it is first checked in step S125 if the accelerator pedal depression amount exceeds a second preset value. If NO in step S125, voltage $V_{AC}$ is generated as idle voltage $V_{AIDL}$ corresponding to idling rotation of engine 11 (step S126), flag TFLG is set to be 1 (step S127), and the flow advances to initial stage f of the vehicle start processing. However if YES in step S125, current engine speed $N_E$ is compared with a target value (step S128), and from the comparison result, voltage $V_{AC}$ is increased, maintained, or decreased to coincide engine rotational speed $N_E$ with the target value (steps S129 to S133), flag TFLG is set to be 1 (step S127), and the flow enters initial stage f of the vehicle start processing.

As previously described, when it is determined that the accelerator pedal depression amount of pedal 81 exceeds the first preset value and the flow enters normal control flow d for starting the vehicle normally (FIG. 7C), voltage $V_{AC}$ is generated as current voltage $V_A$ (step S141). It is checked in step S142 if flag TFLG=1. If YES in step S142, i.e., when the flow advances from the slow-start processing to the normal start processing, counter TCNT is set to be a value obtained by function $A \cdot V_A + B$ (where A and B are constants) of voltage $V_A$ (step S143), and flag TFLG is cleared (step S144). If NO in step S142, flag TFLG is cleared (step S145). It is then checked in step S146 if counter TCNT is 0, and if NO in step S146, counter TCNT is decremented by one (step S147). Next, it is checked in step S148 if the clutch rotation coincides with the engine rotation. If YES in step S148, the flow enters stage g. If NO in step S148, the flow enters initial stage f of the vehicle start processing.

Control associated with flag TFLG and counter TCNT is performed to provide a time lag proportional to voltage $V_A$ when the flow enters the normal control processing from the slow-start processing, and during this time lag, the engine rotation is increased to a speed corresponding to the accelerator pedal depression amount. Since the flow then enters the normal control processing, the engine is prevented from being stopped, and uncomfortable jolting of the operator is prevented.

More specifically, in the above detection of the accelerator pedal depression amount, when the accelerator pedal depression amount is below 10%, or when pedal 81 is depressed to exceed 50% during the later slow-start control, the flow jumps to the normal control processing. In this case, if the normal control processing is immediately executed, a large duty may act depending on a stroke position of clutch 15, clutch 15 is immediately engaged, and torque is transmitted abruptly, resulting in engine stop or generation of a jolt to the operator. When the flow enters the normal control processing from the slow-start processing, count TCNT proportional to the current accelerator pedal depression amount is set, and is decremented in unitary decrements. In this way, the flow is circulated to provide a time lag, and the processing awaits an increase in engine rotation.

Thereafter, when count TCNT reaches 0, it is checked in step S149 if the clutch rotation is synchronized with the engine rotation. If YES in step S149, the flow enters stage g; otherwise, it is checked in step S150 if amount of change $\Delta N_E$ in engine speed $N_E$ per 50 msec is lower than preset value x1. If YES in step S150, it is determined in step S151 that amount of change $\Delta N_E$ increases when the vehicle starts (flag XFLG=1), and it is then checked in step S152 if amount of change $\Delta N_E$ exceeds preset value x2. If YES in step S152, duty control is again performed in step S153. However, if NO in step S152, flag XFLG indicating an increase in amount of change $\Delta N_E$ is cleared (step S154), clutch 15 is fixed in position, and MVQ 111 is disabled (step S155). On the other hand, if NO in step S150 and if NO is obtained in step S156 (i.e., XFLG is not 1), amount of change $\Delta N_E$ is compared with preset value y2 (step S157) and the same processing as above is performed. If YES in step S157, flag YFLG indicating that engine speed $N_E$ decreases abruptly when the vehicle starts is set to be 1 (step S158), and it is checked in step S159 if amount of change $\Delta N_E$ is below preset value y1. If YES in step S159, flag YFLG is cleared (step S160), clutch 15 is held in position and MVQ 111 is disabled (step S155). However, if NO in step S159, clutch 15 is disengaged under the duty control and MVQ 111 is disabled (steps S161 and 162). Note that if amount change $\Delta N_E$ is below preset value y2, it is checked in step S163 if flag YFLG is 1. If YES in step S163, amount change $\Delta N_E$ is compared with preset value y1 (step S159). However, if NO in step S163, clutch 15 is held in position and MVQ 111 is disabled (step S155).

After the control on the basis of amount of change $\Delta N_E$, voltage $V_{AC}$ is generated as current voltage $V_A$. It is then checked in step S165 if flag NEFLG indicating that engine rotating speed $N_E$ is below 400 rpm is 1. If YES in step S165, it is checked in step S166 if engine speed $N_E$ is lower than first engine-stop prevention speed NENST1. If YES in step S166, clutch 15 is disengaged under the duty control (step S167); otherwise, clutch 15 is held in position, flag NEFLG is cleared (step S168), and the flow then advances to stage f. However, if NO in step S165, it is checked in step S169 if engine speed $N_E$ is below second engine-stop prevention speed NENST2. If NO in step S169, the flow enters stage f, and if YES, clutch 15 is disengaged under the duty control, flag NEFLG is set to be 1 (step S170), and the processing then enters stage f.

Figure 8:
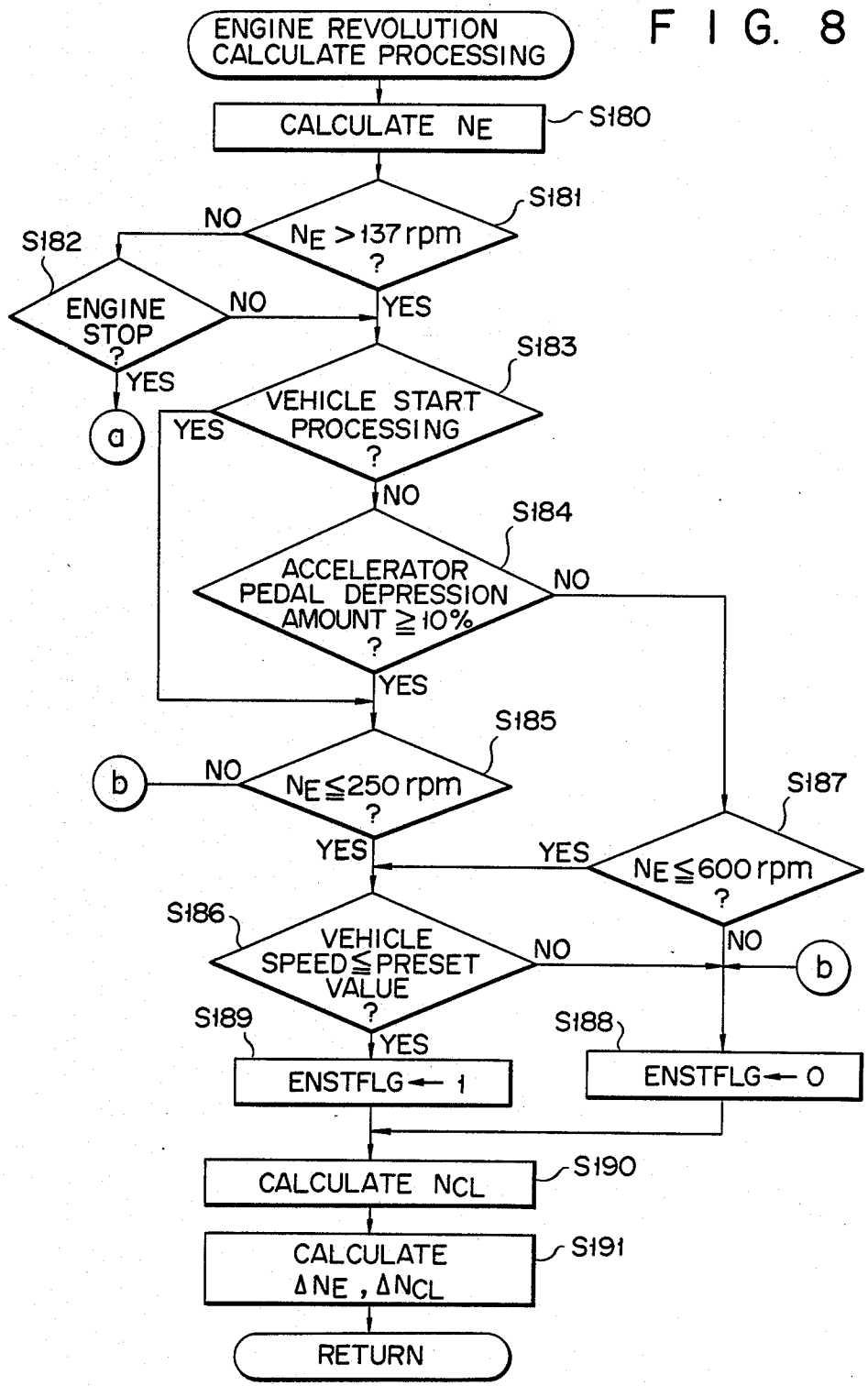
FIG. 8 is a flow chart of ENGINE REVOLUTION CALCULATE PROCESSING.

At a proper timing, i.e., every preset seconds in the processing flow, an engine revolution calculate routine shown in FIG. 8 is executed. First, engine rotating speed $N_E$ is calculated (step S180), and it is then checked in step S181 if engine speed $N_E$ exceeds 137 rpm. If NO step S181, it is checked in step S182 if an oil-pressure gauge switch (not shown) determines that the engine is stopped. If YES in step S182, the flow returns to the processing for initialization before the engine is started. If YES in obtained in steps S181 or NO is obtained in step S182, it is checked in step S183 if the vehicle start processing continues. If NO in step S183, i.e., if the vehicle travels normally, it is checked in step S184, if the accelerator pedal depression amount exceeds 10%. If YES in step S184, it is checked in step S185 if engine speed $N_E$ is lower than 250 rpm. If YES in step S185, it is checked in step S186 if the vehicle speed is below the preset value. If NO in step S184, it is checked in step S187 if engine speed NE is below 600 rpm. If YES in step S187, the flow advances to step S186 to determine if the vehicle speed is lower than the preset value. If NO in step S187, flag ENSTFLG is cleared (step S188). If NO in step S186 or S185, flag ENSTFLG is cleared (step S188), and if YES in step S186, flag ENSTFLG is set to be 1 (step S189). After flag ENSTFLG is cleared or is set to be 1, clutch rotational speed $N_{CL}$ is calculated (step S190) and amount of change $\Delta N_E$ in engine speed $N_E$ per 50 msec and amount of change $\Delta N_{CL}$ in clutch rotational speed $N_{CL}$ per 50 msec are calculated (step S191), and the flow then returns.

After the vehicle start processing, when control unit 71 determines if the vehicle speed or clutch rotational speed $N_{CL}$ exceeds the preset value, the flow enters the change speed processing. As shown in FIGS. 9A to 9F, a selection signal is supplied to input port 101 to check if brake failure occurs (step S200). If YES in step S200, i.e., if wheel brake 107 is defective, it is checked in step S201 if flag SSFLG is 1. If YES in step S201, i.e., if flag SSFLG, indicating that brake 107 is defective and brake pedal 69 is depressed, is 1, it is checked in step S202 if the position of gear shift lever 61 is in the $D_P$ or $D_E$ range. If YES in step S202, the flow advances to detection of flag ENSTFLG (to be described later) and the transmission processing is continued. However, if NO in step S202, i.e., if gear shift lever 61 is in the designated transmission range (i.e., a manual range), it is checked in step S203 if the position of lever 61 coincides with the speed ratio. If YES in step S203, the flow enters the above-mentioned decision of flag ENSTFLG, and if NO in step S203, the position of lever 61 is determined as the target transmission range (step S204) and a change speed operation is then performed, as will be described later. Meanwhile, if NO in step S201, it is checked in step S205 if brake pedal 69 is depressed. If YES in step S205, flag SSFLG is set to be 1 (step S206), and the same processing is performed when flag SSFLG is 1. However, if NO in step S205 or S200, flag SSFLG is cleared (step S207), and it is checked in step S208 if the position of gear shift lever 61 coincides with the speed ratio.

If YES in step S208, the REV pilot lamp is turned off (step S209), and it is then checked in step S210 if speed ratio corresponds to N. If YES in step S210, since there is no problem in synchronizing timing of clutch 15, solenoid valve 55 for air tank 49 is turned off (step S211) and clutch 15 is engaged (step S212). Thereafter, it is checked, in step S213 if flag GFLG indicating that voltage $V_{AC}$ is generated during the change speed operation is 1. If NO in step S213, wear of clutch 15 is checked in step S214, memory MAPMODE for switching the shift maps and flag LEFLG are cleared (steps S215 and S216). If YES in step S213, that is, when a pseudo-accelerator signal voltage $V_{AC}$ cancelling time lag is set (step S217), and then the previously mentioned $V_{AC}$ stepwise cancelling routine is executed (step S218) before the flow advances to the next step.

On the other hand, if NO in step S210, the flow advances to a routine for synchronizing clutch 15. It is checked in step S219 if flag ENSTFLG is 1, and if YES in step S219, when engine speed $N_E$ is below the engine-stop prevention speed when the vehicle speed has been decreased, clutch 15 is disengaged (step S220) and a $V_{AC}$ relay (not shown) is turned off (step S221). Next, after memory MAPMODE and flag LEFLG are cleared, as described previously (steps S215 and S216), the flow returns to the main routine. Conversely, if NO in step S219, it is checked in step S222 if a difference between engine rotating speed $N_E$ and clutch rotational speed $N_{CL}$ is below the preset value, i.e., if they are synchronized with each other. If YES in step S222, clutch 15 is engaged immediately (step S212). However, if NO in step S222, it is checked in step S223 if clutch 15 is disengaged. If clutch 15 is engaged, the flow returns to the clutch connection flow (step S212). If clutch 15 is disengaged, it is checked in step S224 if the accelerator pedal depression amount is below 10%. If YES in step S224, i.e., if pedal 81 is not depressed, the flow enters the vehicle start processing only when clutch rotational speed $N_{CL}$ is below the preset value (step S225) and the vehicle speed is also below the preset value (step S226). If NO is obtained in step S225, the CLLE routine (step S227) is executed to set clutch 15 in he before-engage state. Meanwhile, if NO is obtained in step S224, it is determined in step S227 that the operator intends to move the vehicle, and the CLLE routine is executed without executing the vehicle start processing. Thereafter, voltage $V_{AC}$ corresponding to clutch rotational speed $N_{CL}$ is generated (step S228), and clutch 15 is gradually engaged based on the optimal duty ratio (step S229). Then, the flow returns to an initial step of the change speed processing, and the above processing is repeated until engine 11 and clutch 15 are synchronized with each other or clutch 15 is engaged.

If NO is obtained in step S208, it is checked in step S230 if the position of gear shift lever 61 is in the $D_P$ or $D_E$ range. If YES in step S230, one of the shift maps for determining the optimal speed ratio corresponding to the vehicle running condition is selected. More specifically, a content of memory MAPMODE is checked in step S231, and if it is 0, i.e., if the shift map has not yet been selected, it is checked in step S232 if exhaust brake device 121 is used. If NO in step S232, a first shift map is selected and memory MAPMODE is set to be 1 (steps S233 and S234). If YES in step S232, it is then checked in step S235 if brake pedal 69 is depressed. If YES in step S235, a second shift map is selected and memory MAPMODE is set to be 2 (steps S236 and S237). If NO in step S235, a third shift map is selected and memory MAPMODE is set to be 3 (steps S238 and S239). On the other hand, if NO in step S231, i.e., if the shift map has already been selected for the current change speed processing, the flow advances to the selected shift map processing. This is to maintain, once a shift map is selected during the change speed processing, an identical shift map until the change speed processing is completed.

Thereafter, the target speed ratio is determined from the selected shift map (step S240), and it is checked in step S241 if the current speed ratio coincides with the target speed ratio. If YES in step S241, the flow advances to decision of flag ENSTFLG for maintaining the current speed ratio (step S219). If NO in step S241, it is checked in step S242 if the target speed ratio is higher or lower than the current speed ratio, i.e., if a shift-up operation is to be performed. If YES in step S242, only when the position of control rack 23 of pump 21 exceeds the preset value (step S243) is the change speed operation performed; otherwise, the current speed ratio is maintained without performing the change speed operation. This is to prevent a shift-up operation from being performed even though engine 11 has an insufficient power margin. Conversely, if NO in step S242, only when the exhaust brake is not used (step S244), brake pedal 69 is depressed deeply (step S245), and a shift-down operation is to be performed from the 5th speed or lower is the current speed ratio maintained without performing the change speed operation; otherwise, the change speed operation is performed.

If NO is obtained in step S230, it is checked in step S251 if the position of lever 61 corresponds to one designated or indicated speed ratio. If YES in step S251, the flow advances to the next step only when NO is obtained in step S252 (i.e., the R range is not selected). It is checked in step S253 if the shift-up operation is to be performed. If YES in step S253, the buzzer is turned off (step S254), and an NEAIDL routine is executed (step S255), thus disengaging clutch 15.

Figures 1, 9A:
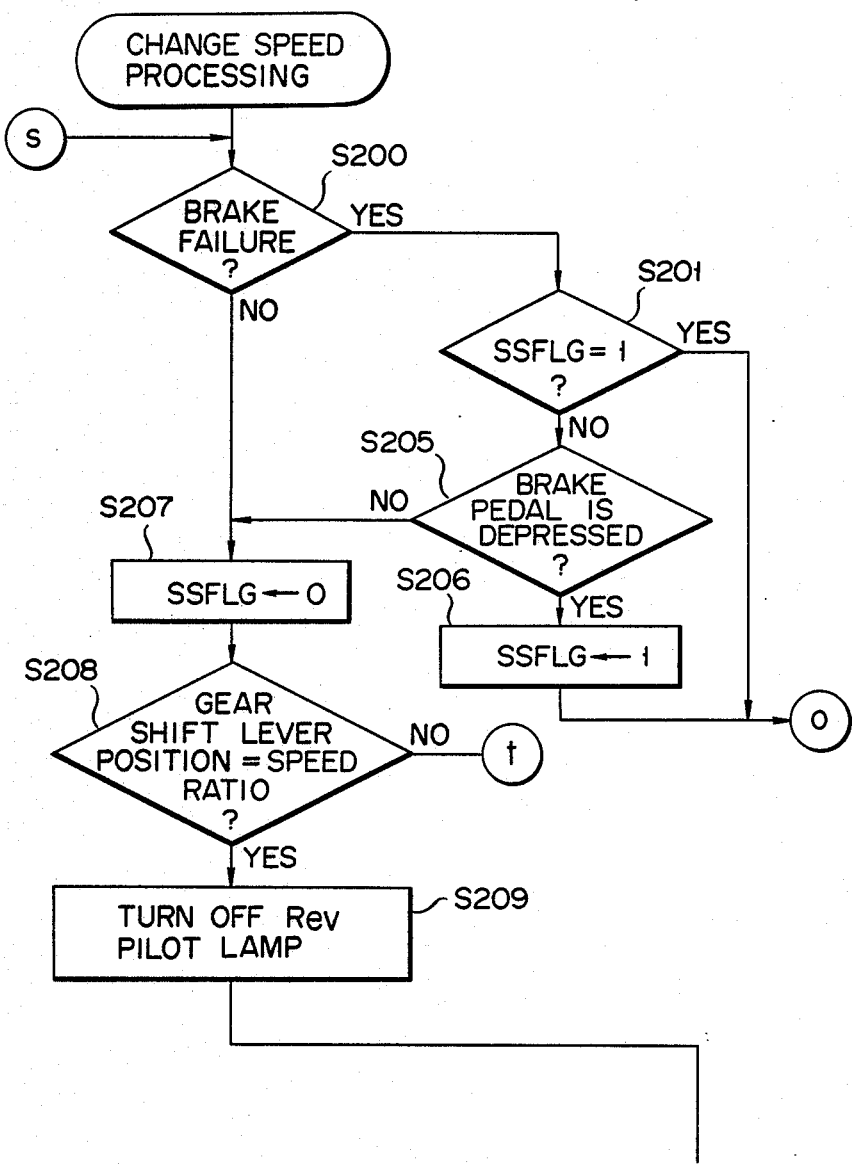
Figures 2, 9A:
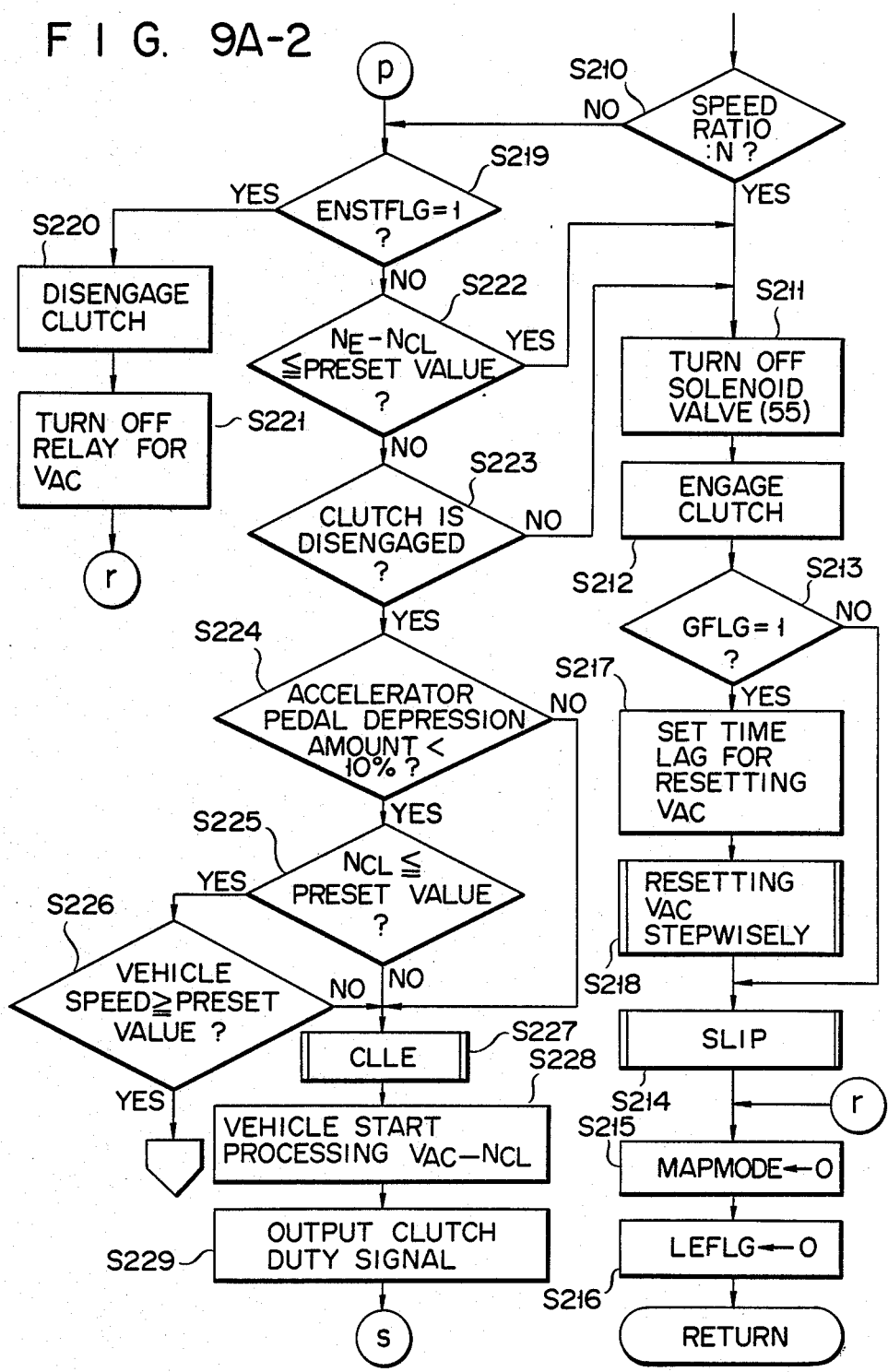
Figure 9B:
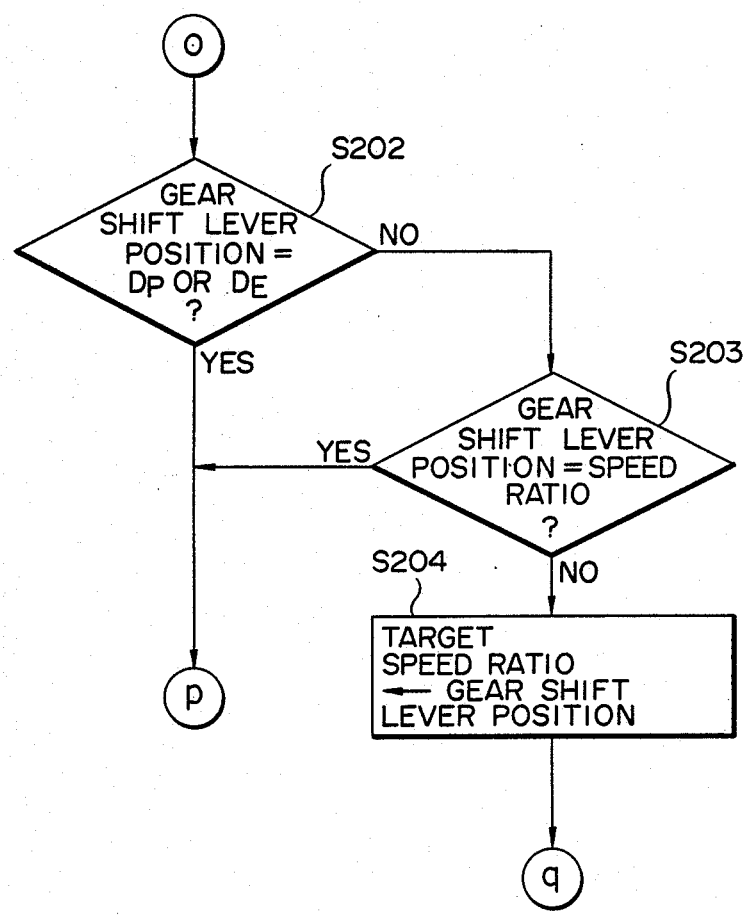
FIG. 9B is a flow chart of CHANGE SPEED PROCESSING.
Figures 1, 9C:
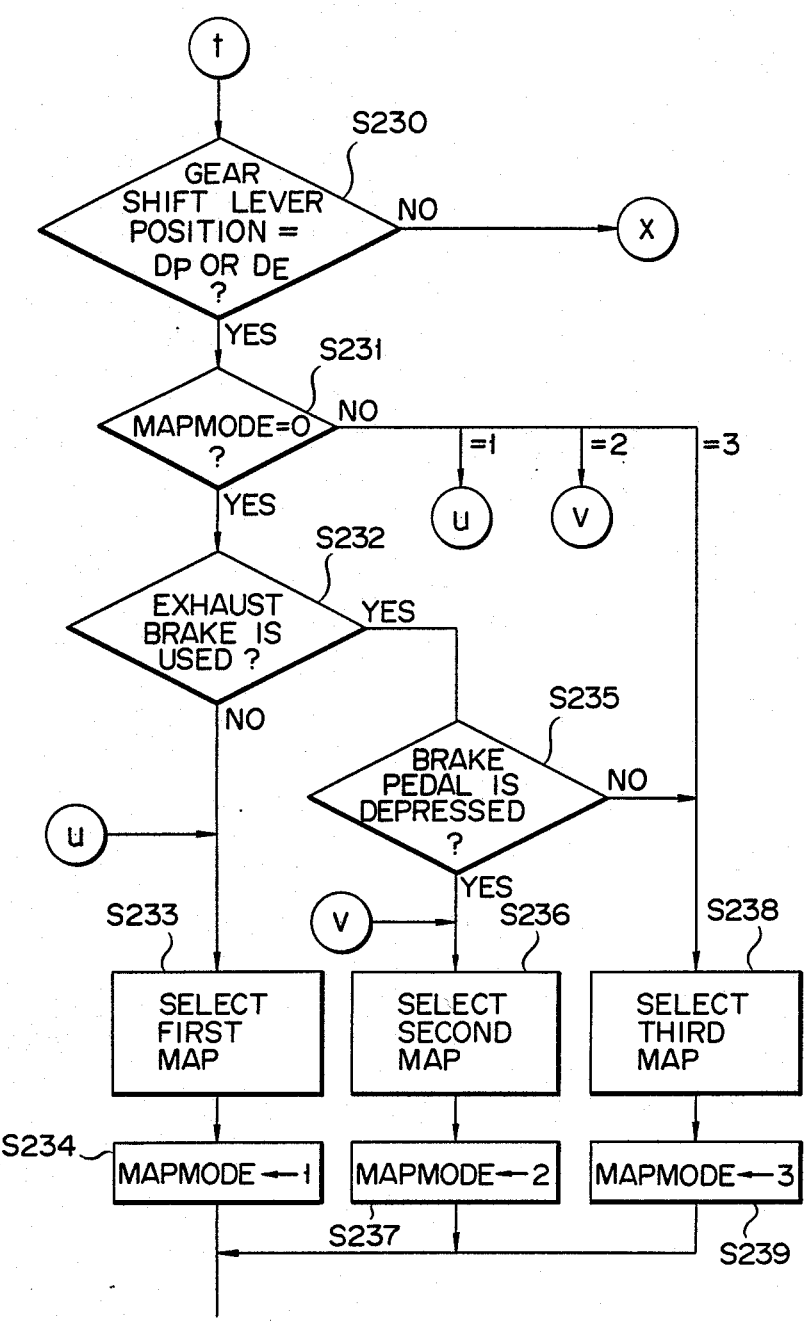
Figures 2, 9C:
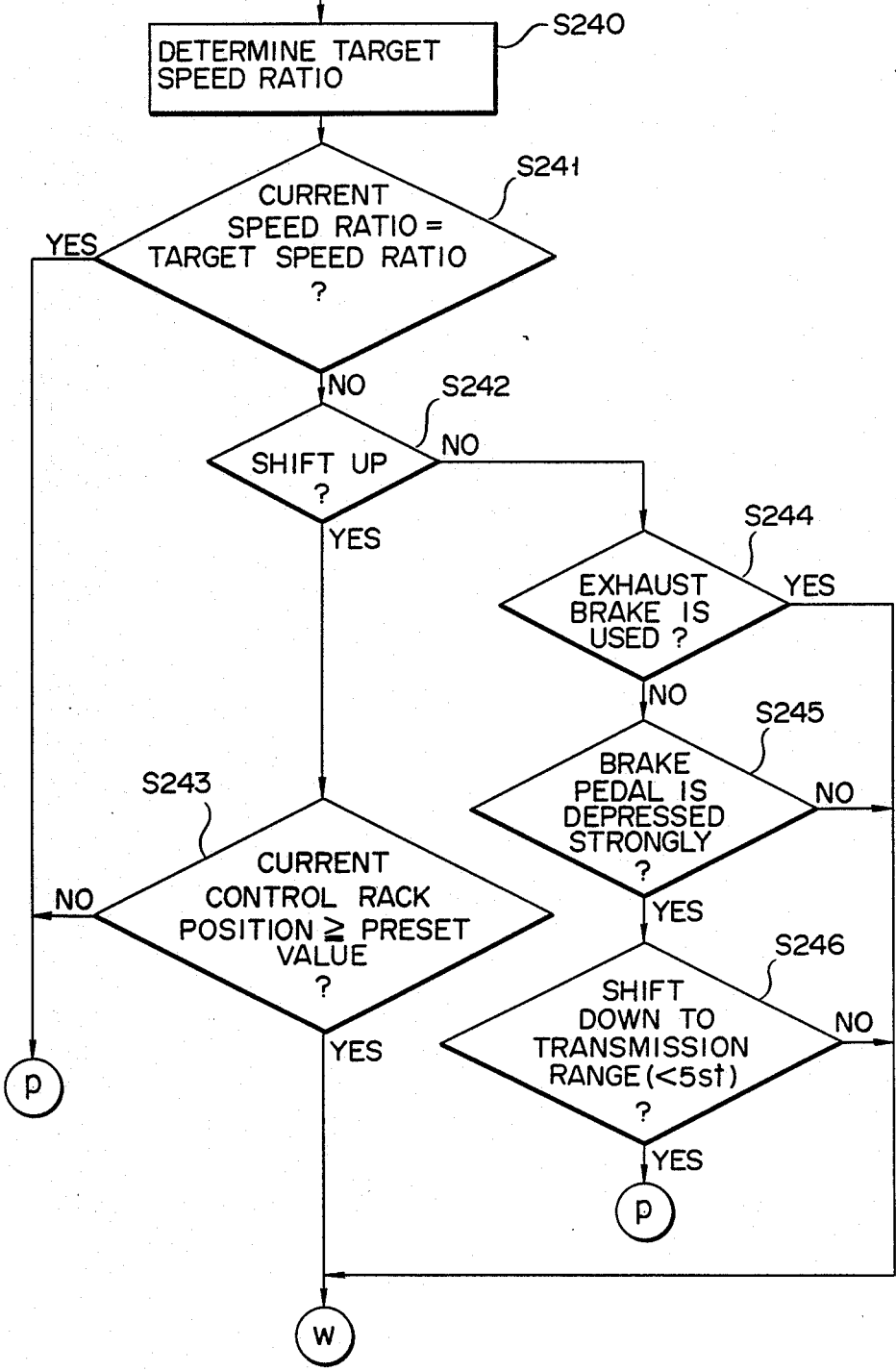
Figures 1, 9D:
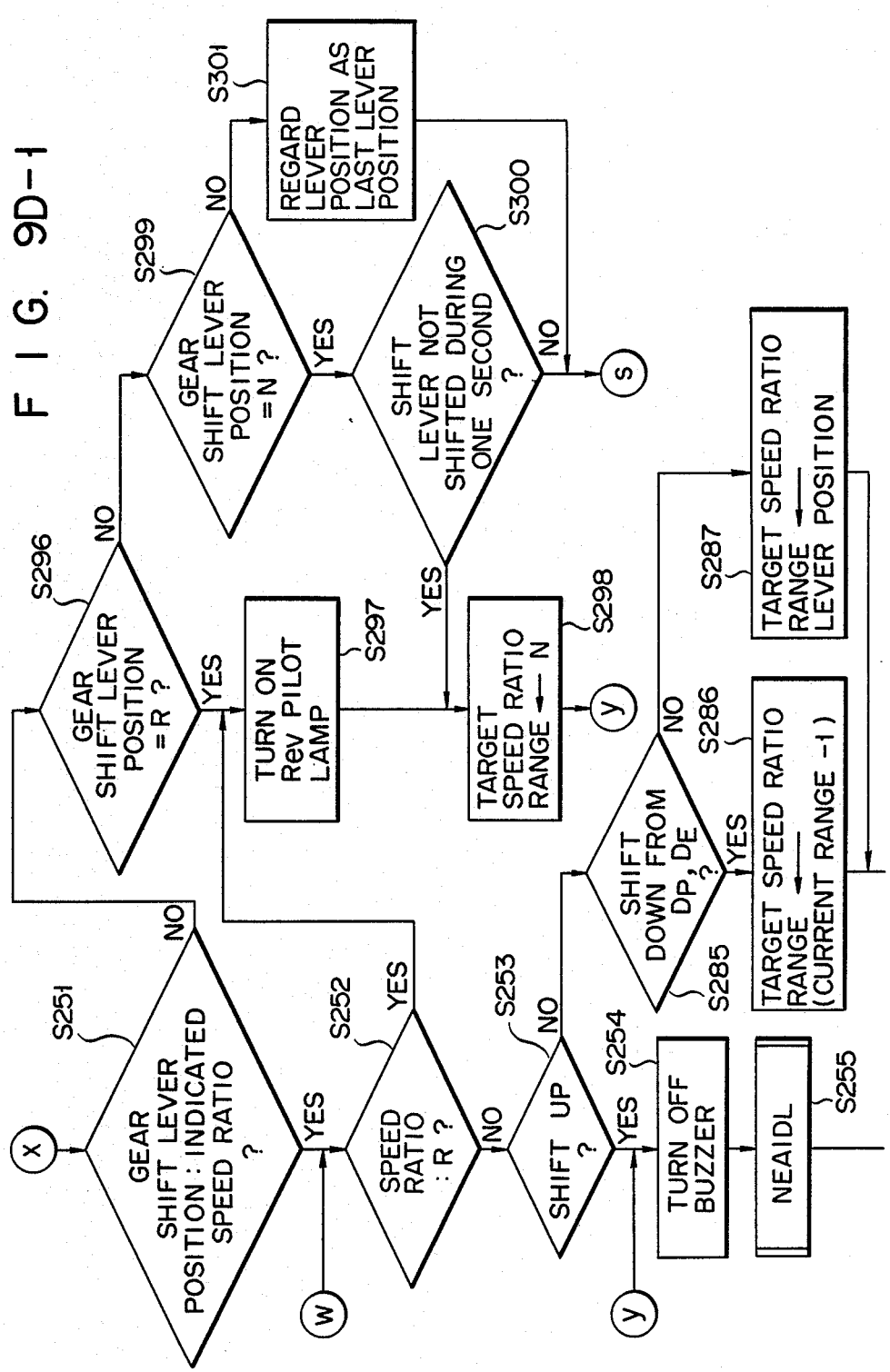
Figures 2, 9D:
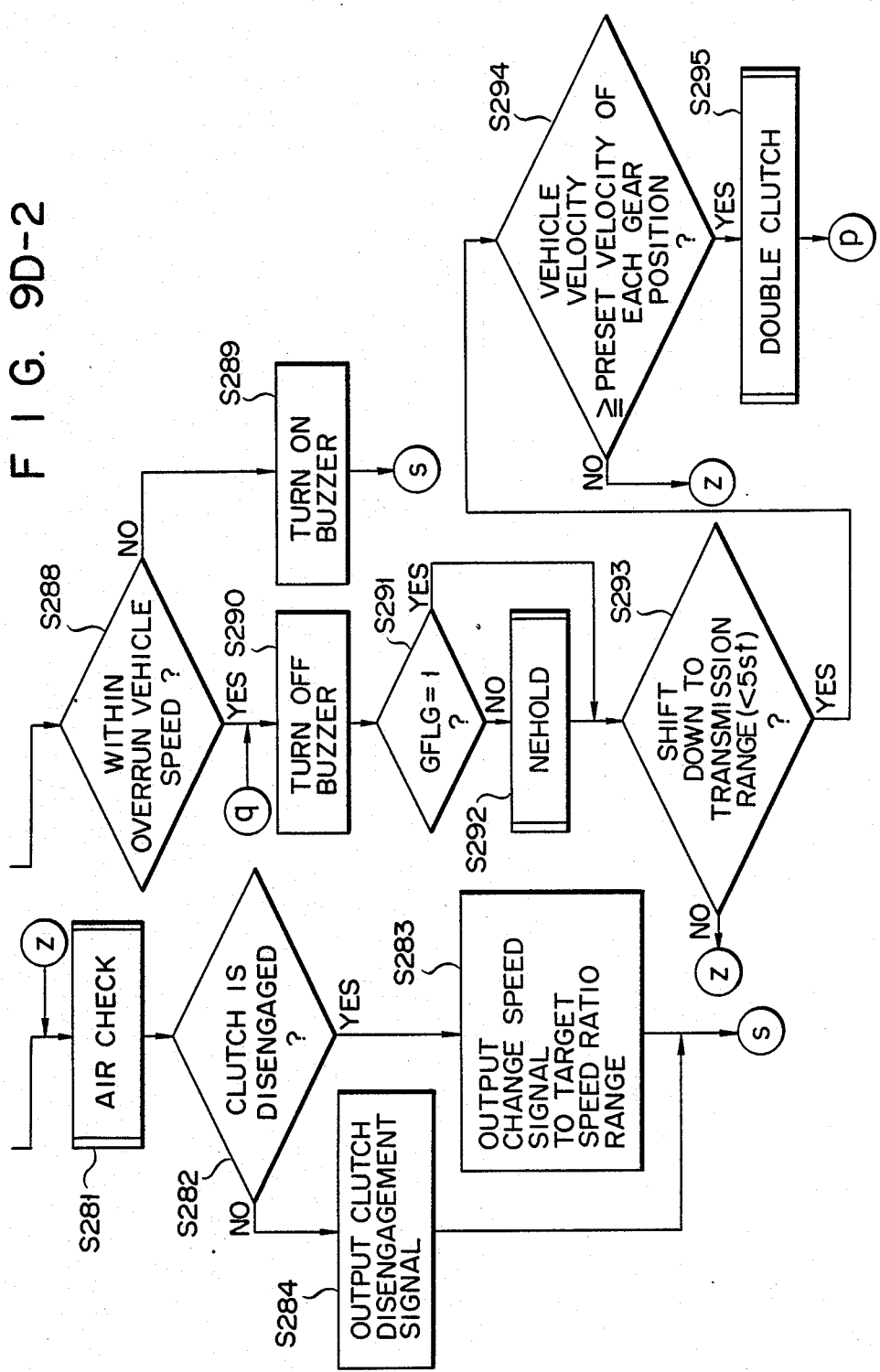
Figure 9E:
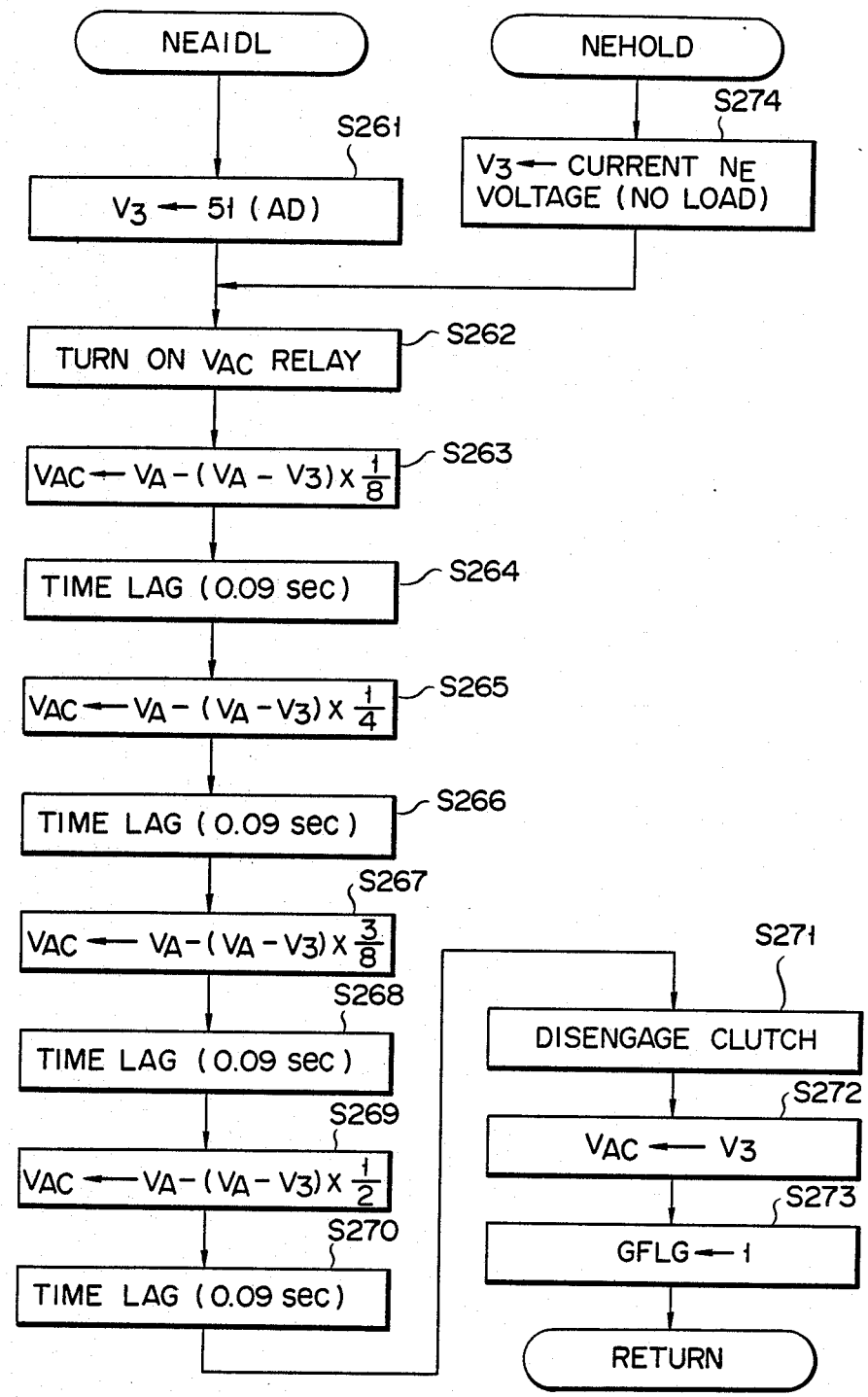
FIG. 9E is a flow chart of NEAIDL.

In the NEAIDL routine, as shown in FIG. 9E, preset voltage $V_3$ for setting engine 11 at the idling speed is written in third operation memory $R_3$ for generating the pseudo-accelerator signal voltage (step S261), and the $V_{AC}$ relay is turned on so that a control signal from control rack 23 can be supplied to actuator 25 (step S262). Next, voltage V is set at values $V_{AC}=V_A-(V_A-V_3)\times\frac{1}{8}$, $V_{AC}=V_A-(V_A-V_3)\times\frac{1}{4}$, $V_{AC}=V_A-(V_A-V_3)\times 3/8$ and $V_{AC}=V_A-(V_A-V_3)\times\frac{1}{2}$, and they are generated for a predetermined period of time (e.g., 0.09 sec) in steps S263 to S270 (see FIG. 11). This is to decrease voltage $V_{AC}$ stepwise without a sudden decrease, thus eliminating jolting of the operator. Thereafter, clutch 15 is disengaged (step S271). Voltage $V_{AC}$ is set to equal voltage $V_3$, flag GFLG indicating that voltage $V_{AC}$ is generated is set to be 1, and thereafter, the flow returns to the main routine.

After the NEAIDL routine is completed, an air-check routine is executed (step S281) and it is checked in step S282 if clutch 15 is actually disengaged. If YES in step S282, the change speed signal for coinciding the speed ratio to the target speed ratio is supplied to solenoid valves 73 to perform the change speed operation (step S283). However, if NO in step S282, a signal for disengaging clutch 15 is generated (step S284), and thereafter, the flow returns to the initial step of the change speed processing.

Figure 12:
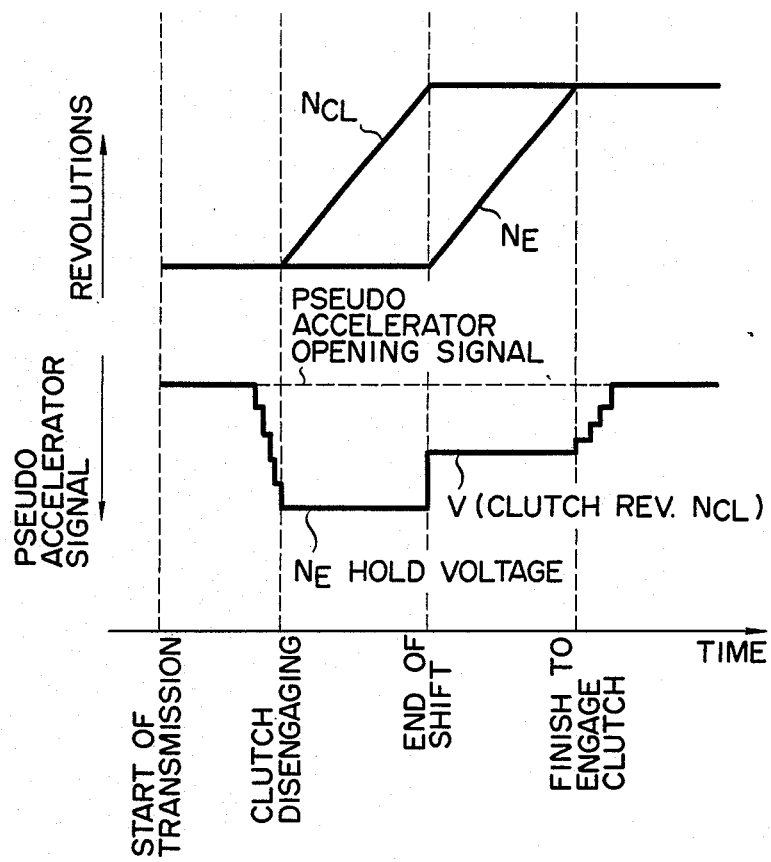
FIG. 12 is a diagram of a shift-down operation.

If NO is obtained in step S253, i.e., if the shift-down operation is to be performed, it is checked in step S285 if the shift-down operation is performed from the $D_P$ or $D_E$ range. If YES in step S285, the target speed ratio is set by decrementing the current speed ratio by one (step S286), and if NO in step S285, the position of lever 61 is set as the target speed ratio (step S287). Next, it is checked in step S288 if the shift-down operation can be performed without racing engine 11. If NO in step S288, the buzzer is turned on to signal for the operator that the engine may race (step S289), and the flow then returns to the initial step of the change speed processing without performing the change speed operation. If YES in step S288, after the buzzer is turned off (step S290), flag GFLG is checked (step S291). Only when voltage $V_{AC}$ is not generated is an NEHOLD routine (step S292) executed to disengage clutch 15. The NEHOLD routine shown in FIG. 9E is substantially the same as the NEAIDL routine except that voltage $V_3$ corresponding to engine speed $N_E$ in a no load state is written in memory $R_3$ (step S274). Thus, voltage $V_{AC}$ is decreased stepwise and clutch 15 is disengaged (see FIG. 12).

Thereafter, when it is determined that the shift-down operation is not performed from the 5th speed or lower (step S293), or that the vehicle speed does not exceed a preset value in the target speed ratio (step S294), the previously mentioned air-check routine is executed and the change speed operation is then performed. On the other hand, when the shift-down operation is performed from the 5th speed or lower and the vehicle speed is higher than the preset value, a double-clutch routine is executed (step S295).

Figure 9F:
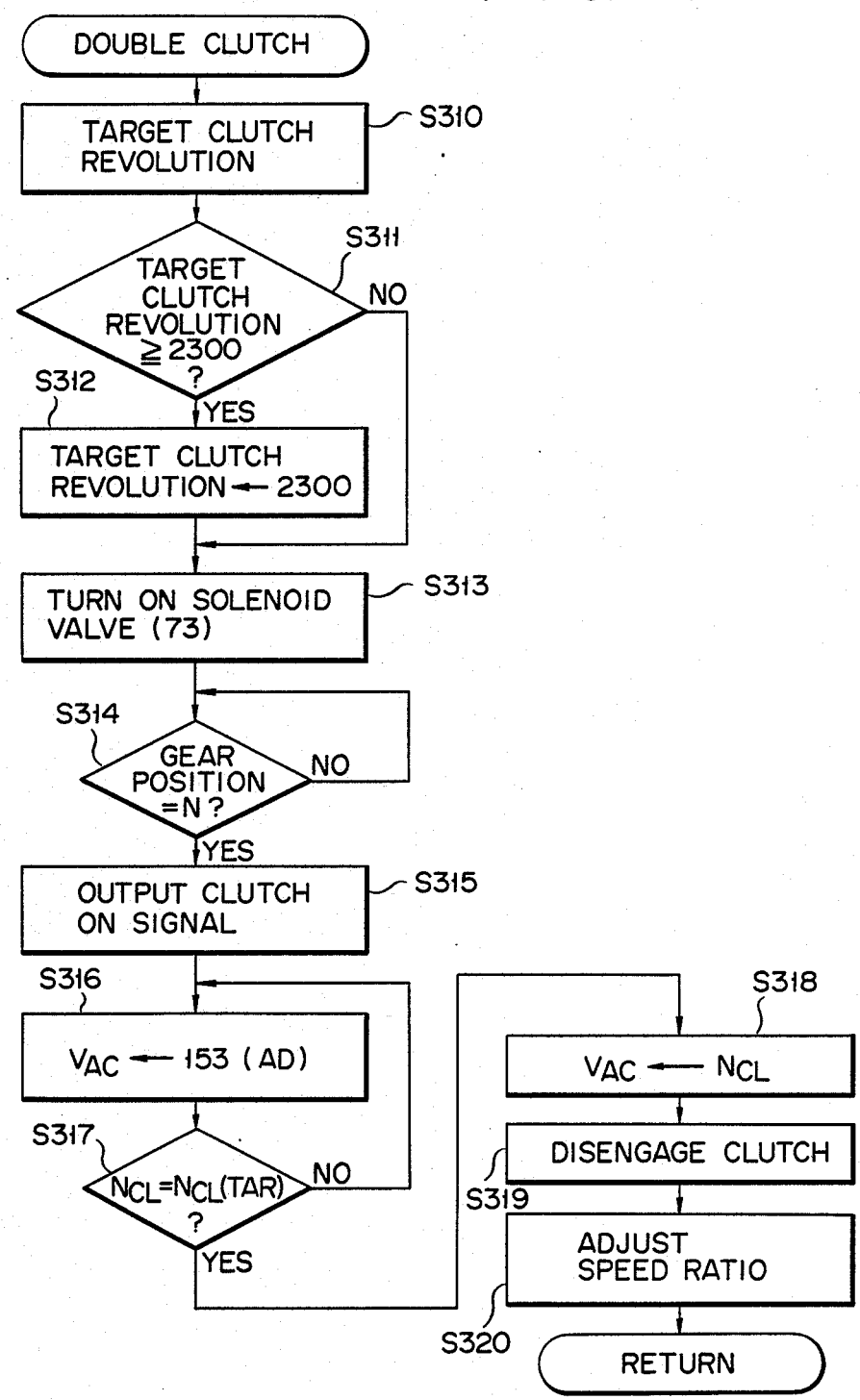
FIG. 9F is a flow chart of DOUBLE CLUTCH routine.

In the double-clutch routine, as shown in FIG. 9F, predetermined constant C (e.g., 1.5) corresponding to the speed ratio is multiplied with current clutch rotational speed $N_{CL}$, thus temporarily setting target clutch rotational speed $N_{CL(TAR)}$ (step S310). It is checked n step S311 if target clutch rotational speed $N_{CL(TAR)}$ exceeds 2,300 rpm as an upper-limit rotational speed. If YES in step S311, 2,300 rpm is set as the target clutch rotational speed (step S312), and if NO in step S311, that value is used as the target clutch rotational speed. Solenoid valves 73 are turned on (step S313), and after the speed ratio is judged to be in the N range (step S314), a clutch ON signal is generated (step S315), and voltage $V_{AC}$ is set at predetermined value (step S316), so that clutch rotational speed $N_{CL}$ coincides with target clutch rotational speed $N_{CL(TAR)}$ (step S317). Thereafter, voltage $V_{AC}$ is set at a value corresponding to clutch rotational speed $N_{CL}$ (step S318), the speed ratio is then adjusted (step S320), and the flow then returns to the main routine.

If NO is obtained in step S251, it is checked in step S296 if the position of gear shift lever 61 is in the R range. If YES in step S296, since lever 61 is erroneously shifted to the R range during forward running, the REV pilot lamp is turned on (step S297) and the change speed operation is performed using the N range as the target speed ratio (step S298). Even when the forward range is selected by lever 61, if the speed ratio corresponds to the R range, the REV pilot lamp is turned on to set the target speed ratio in the N range. However, if NO in step S296, it is checked in step S299 if the position of lever 61 is in the N range. If YES in step S299, when lever 61 is fixed in the N range for 1 sec (step S300), it is determined that the operator has selected the N range, and the N range is set as the target speed ratio (step S298). Conversely, although lever 61 is temporarily in the N range, if it is moved therefrom within 1 sec, the flow returns to the initial step of the change speed processing. When the position of lever 61 is not in the N range, i.e., when lever 61 is in an uncertain position which does not belong to any range, it is determined that the current position of lever 61 is regarded as the previous position thereof (step S301), and the flow returns to the initial step of the change speed processing.

In this embodiment, air cylinder 33 for actuating clutch 15 is driven using the pneumatic pressure from air tank 47 or 49 provided in the vehicle. However, a hydraulic pressure be used as a control medium. In this case, a hydraulic pressure generation source (e.g., an oil pump) must be added, and this may result in increased cost. The change speed control sequence and shift patterns can be changed if needed. The present invention can be applied to a vehicle with a gasoline engine.

According to the embodiment of the present invention described above, a drive system (e.g., a normal friction clutch, a parallel shaft type gear transmission, and the like) is used without any modification, and an actuator for the friction clutch or a power cylinder for a speed ratio changing means is driven using pneumatic pressure from an air tank of the vehicle to perform the change speed operation. Thus, a low-cost automatic transmission apparatus can be obtained without greatly modifying conventional manufacture equipment of vehicles. When a vehicle is started facing uphill on a slope, a brake is operated until the clutch is engaged to a certain extent so as not to move the vehicle downhill. In addition, when the vehicle is to be started slowly on the slope, it can be smoothly started without moving backward.

Furthermore, in a start standby mode, since an exhaust brake device is automatically rendered inoperative, start and exhaust resistances to fuel caused by an unnecessary exhaust brake force can be prevented, thus realizing smooth starting and low fuel consumption.

Figure 13:
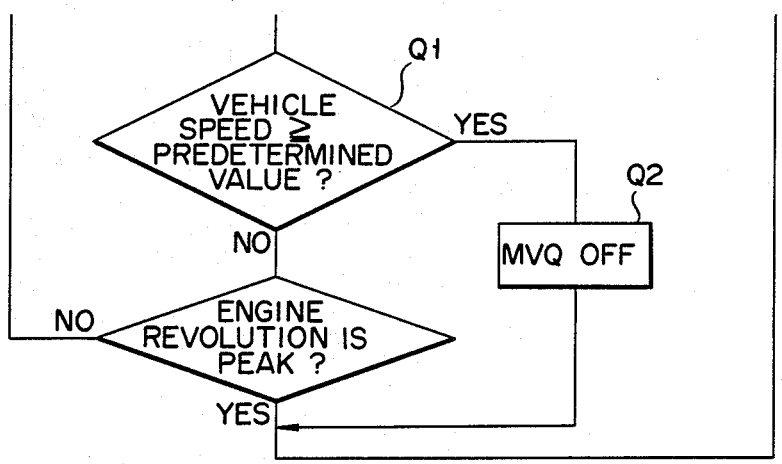
FIG. 13 a flow chart of a main routine according to a second embodiment.

A second embodiment of the present invention will be described with reference to FIG. 13. In the first embodiment, as shown in steps S66 and S67 in FIG. 7A, when engine speed $N_E$ reaches its peak value, MVQ 111 is turned off and the AUS is disabled. However, as shown in FIG. 13, when the vehicle speed exceeds the preset value (step Q1), MVQ 111 is turned off (step Q2), so that an unnecessary brake operation is cancelled in the slope-start mode, thus starting the vehicle smoothly on the slope.

Figure 14:
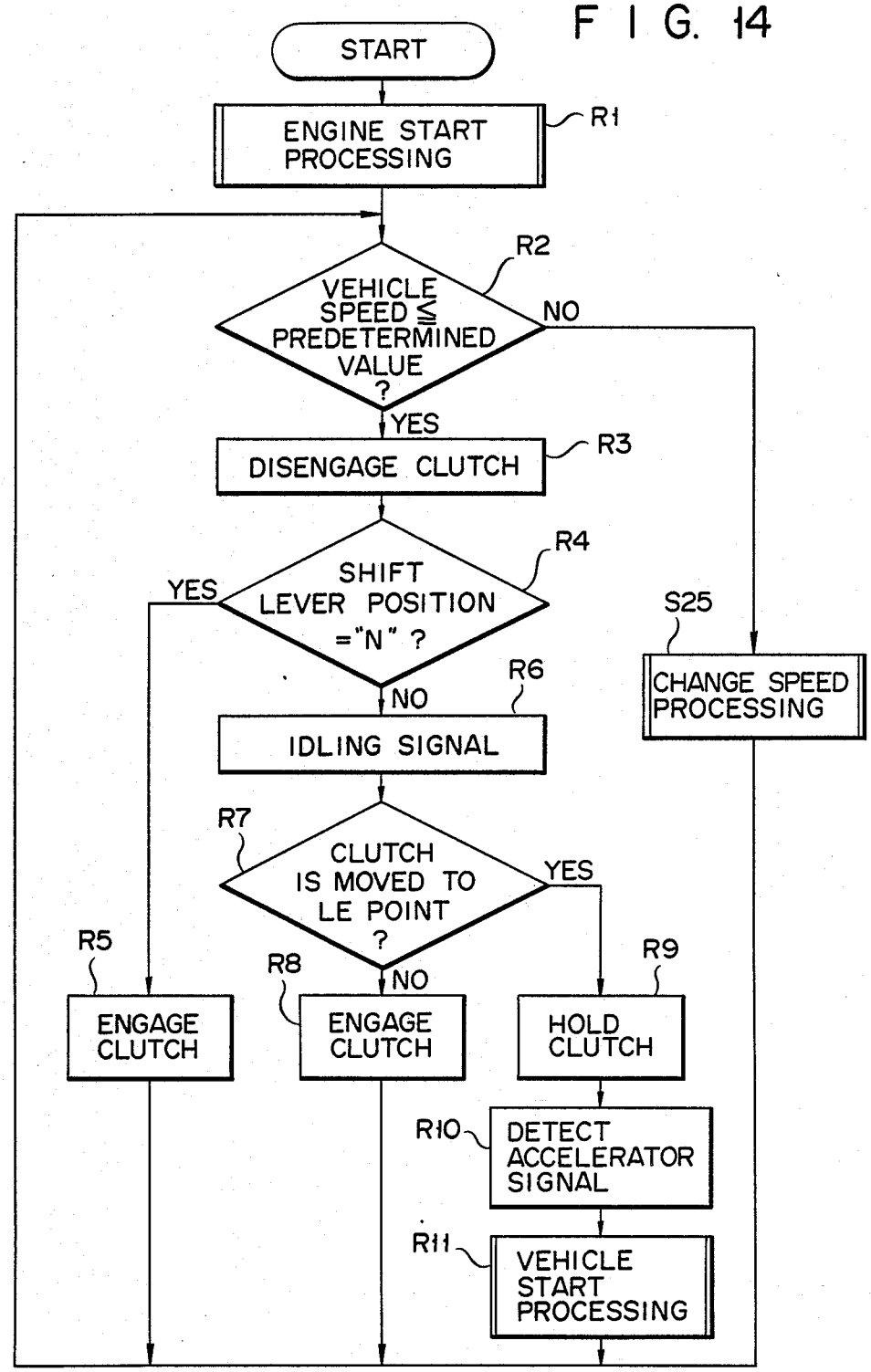
FIG. 14 is a flow chart of a main routine according to a third embodiment.

A third embodiment of the present invention will now be described with reference to FIG. 14. A flow chart of FIG. 14 is another embodiment of the main routine shown in FIG. 5, and the processing thereof will be explained below.

First, engine start processing is performed such that respective parts are checked, input signals are fetched, and other pre-processing is performed (step R1). After the engine starts, it is checked in step R2 if the vehicle speed is lower than a preset value (e.g., 2 to 3 km/h), thus discriminating that the vehicle will stop or move. If YES in step R2, clutch 15 is disengaged. Subsequently, it is checked in step R4, based on a change speed signal and a speed ratio signal, if a speed ratio other than the N range is selected. If YES in step R4, the flow advances to step R5, and clutch 15 is engaged. Thereafter, the flow returns. However, if NO in step R4, an idling signal for a no load state is immediately supplied to microcomputer 93 as a pseudo-accelerator signal. It is checked in step R7 if clutch 15 is at LE point immediately before it is half-engaged. Next, the flow advances to clutch stroke control along the time axis, as shown in FIG. 15.

More specifically, at time a, the flow advances from step R7 to step R8 at the NO side, solenoid valve 51 is turned off, and a pulse signal at a predetermined duty ratio is applied to solenoid valve 53 to reduce the pneumatic pressure, thus returning clutch 15 in an engaging direction. The flow then returns. At time b when clutch pneumatic pressure P1 corresponding to LE point is detected, the flow advances from step R7 to step R9 at the YES side. In this case, solenoid valve 53 is turned off in order to hold pressure P1 and the flow then advances to step R10. In step R10, the pseudo-idling signal is cut off, and the flow enters normal load signal detection. In other words, the control enters half-clutch waiting region c of FIG. 15.

When the accelerator pedal depression amount exceeds the preset value, clutch 15 is engaged in accordance with the vehicle start processing (step R11), thus starting the vehicle.

Thereafter, the vehicle is accelerated in accordance with the engine rotating speed. When the vehicle speed exceeds a preset value in step R2, the flow advances to step R12 to perform the change speed processing. In this processing, control unit 71 is operated based on a change speed signal, a vehicle speed signal, and a load signal, so that clutch 15 is first disengaged, and an actuation signal is supplied to change speed unit 65 to change the speed ratio to a target speed ratio during the disengagement of clutch 15. Thereafter, solenoid valve 53 is opened to engage clutch 15, and the flow then returns.

In the above processing, alternative long and two short dashed curves in FIGS. 15 and 16 represent a conventional start method. As can be seen from these graphs, at time d when the accelerator pedal begins to be depressed, a clutch stroke begins to fall in the conventional method, and time f' when engine rotational force begins to be transmitted to input shaft 39 of transmission 17 is delayed from time f in the method of the present invention. As a result, the rotational force begins to be transmitted at time e' when engine speed N is relatively high, and time g' when engine speed N coincides with rotational speed N1 of input shaft 39 is also delayed from time g of this invention, resulting in high rotitional speed at that time.

An automatic transmission apparatus of this invention drives gear shift unit 65 based on a change speed signal from gear shift lever 61, thus changing gear ratio in transmission 17. However, the present invention can be applied to a transmission apparatus in which a transmission is manually operated, and a clutch is engaged/disengaged automatically. In this case, since a controller for transmission is unnecessary, only a controller for controlling the clutch need be provided, thus simplifying the apparatus.

In this way, time interval T1, from depression of the accelerator pedal (time d) to time g when engine speed N coincides with rotational speed N1 of input shaft 39 of transmission 17, can be shortened when compared with that of the conventional method (indicated by time interval T2 in FIG. 16), thus ensuring good vehicle starting. Furthermore, difference N−N1 between engine speed N and clutch rotational speed N1, before reaching a clutch operation region (from time f to g) during which they coincide with each other, can be reduced when compared with the conventional method, thus improving durability of the clutch. In addition, if a psuedo-idling signal is generated from the clutch disengaged state to the before-engage state, unnecessary high engine output can also be prevented.

Other embodiments of the main routine shown in FIG. 5 will be described with reference to FIGS. 17 to 19. The flow chart according to a fourth embodiment will be explained h reference to FIG. 17.

Engine start processing is performed such that respective parts are checked, input signals are fetched, and other pre-processing is performed (step C1). After the engine starts, it is checked in step C2 if the vehicle speed is lower than a preset value (e.g., 2 to 3 km/h), thus discriminating that the vehicle will stop or move. If YES in step C2, the flow advances to step C3 and an ON signal is supplied to solenoid valves 51 and 53 to disengage clutch 15. It is then checked from the change speed signal in step C4 if the position of the shift lever is in the $D_P$ or $D_E$ range. If YES in step C4, the flow advances to step C5; otherwise, to step C6. It is checked in step C5 if 1st-speed start switch 105 is turned on, i.e., if 1st-speed start signal is supplied. If YES in step C5, the flow advances to step C7; otherwise, to step C8. When 1st-speed start signal is supplied, an actuation signal is supplied to solenoid valves 73 to operate change speed unit 65, so that the speed ratio is changed to the 1st. When no 1st-speed start signal is supplied, the speed ratio is changed to the 2nd-speed ratio as a normal start range (step C8). When the flow advances from step C4 to step C6, the transmission is adjusted to the speed ratio designated by the gear shift lever. Thereafter, the vehicle start processing is executed in step C9 through steps C6, C7, and C8. In this processing, solenoid values 51 and 53 are continuously energized or operated by a pulse signal at a predetermined duty ratio, thus adjusting a clutch engaged/disengaged state. With such adjustment, clutch 15 is engaged. If NO in step C2, i.e., if the vehicle moves, the flow advances to step C10 and the change speed processing is performed. In this processing, control unit 71 is operated based on the change speed signal, the vehicle speed signal, and the accelerator opening (load) signal so that clutch 15 is first disengaged, and during the disengagement, table lookup of a change speed selection map is performed to select a speed ratio (2nd speed or more) corresponding to the vehicle speed and the accelerator pedal depression amount. Next, the speed ratio is changed to the selected optimal speed ratio, and thereafter, solenoid valve 53 is operated by a pulse signal at duty ratio $\alpha$ to engage clutch 15. The flow then returns.

In this way, only when the 1st-speed start switch 105 is turned on and 1st-speed start signal is input is the vehicle start processing performed using the 1st-speed range as the start range. After the vehicle starts, the change speed processing is performed so that the 2nd speed or higher is selected even if 1st-speed start switch 105 is left ON.

Fifth embodiment of the main routine shown in FIG. 5 will now be described with reference to FIG. 18. An automatic transmission apparatus used in this embodiment is substantially the same as that used in FIG. 17. Therefore, since FIG. 18 includes the same control steps as in FIG. 17, they will be omitted from the following descriptions. A memory of control unit 71 stores, in addition to the above-mentioned data, limit rotational number Ng (in this embodiment, 100 rpm in view of the rotational speed of input shaft 39) at which gears do not grind because of rotation of a counter shaft of transmission 17 when a 1st-speed gear train (which does not comprise a synchronizing mechanism) is meshed. Furthermore, the rotational speeds of input shaft 39 and the counter shaft, which are rotated by inertia upon reception of engine rotation, decrease as the time elapses from disengagement of clutch 15. Thus, the memory of unit 71 also stores predetermined time Tm required for decreasing the rotational speed to a value which can prevent or suppress gears from grinding (time Tm is also restricted by its length in view of transmission smoothness). Note that in this embodiment, predetermined time Tm is 0.8 to 1.0 sec.

Figure 17:
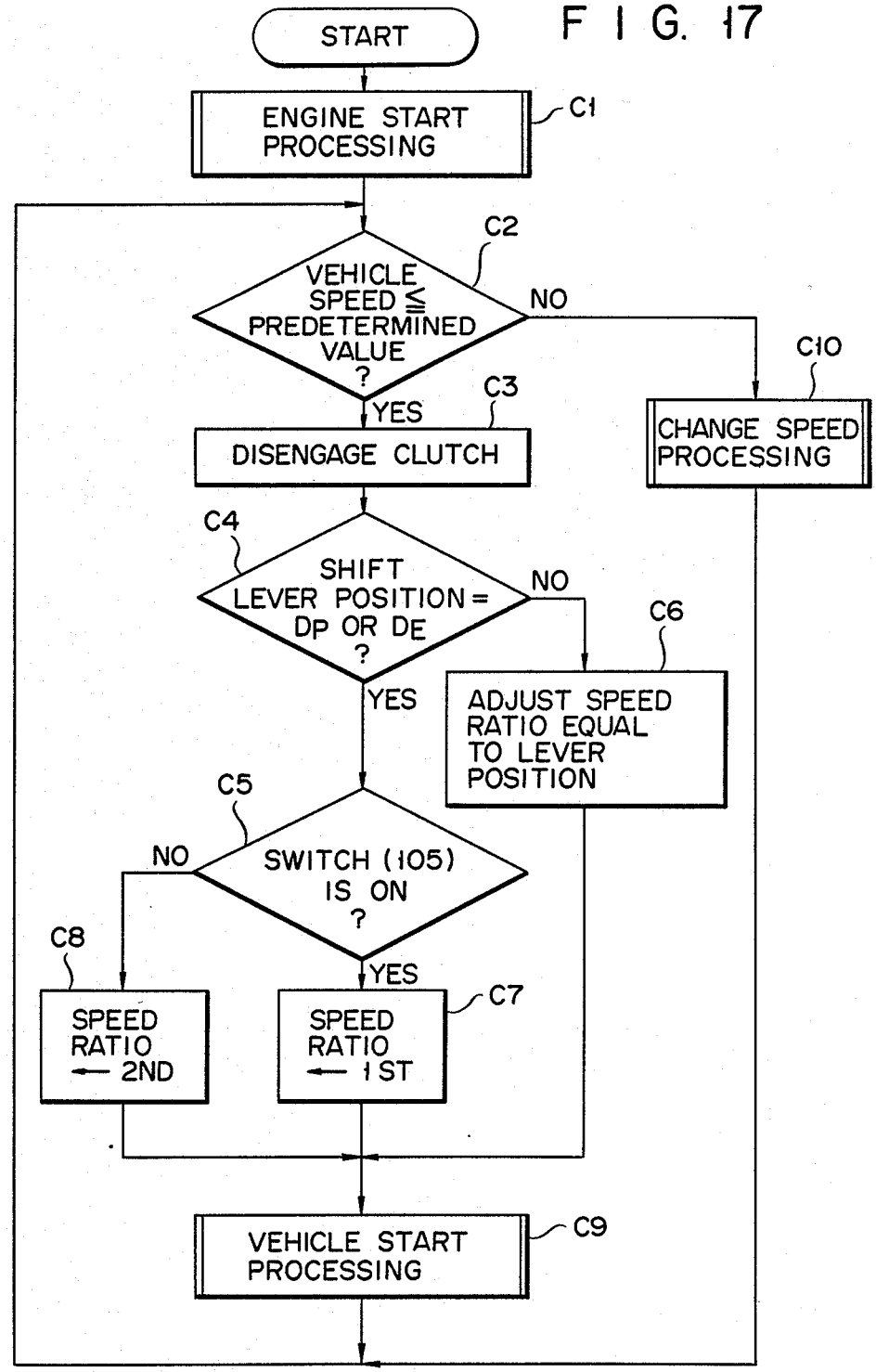
FIGS. 17 to 20 are flow charts of main routines according to a fourth embodiment to a seventh embodiment respectively.
Figure 18:
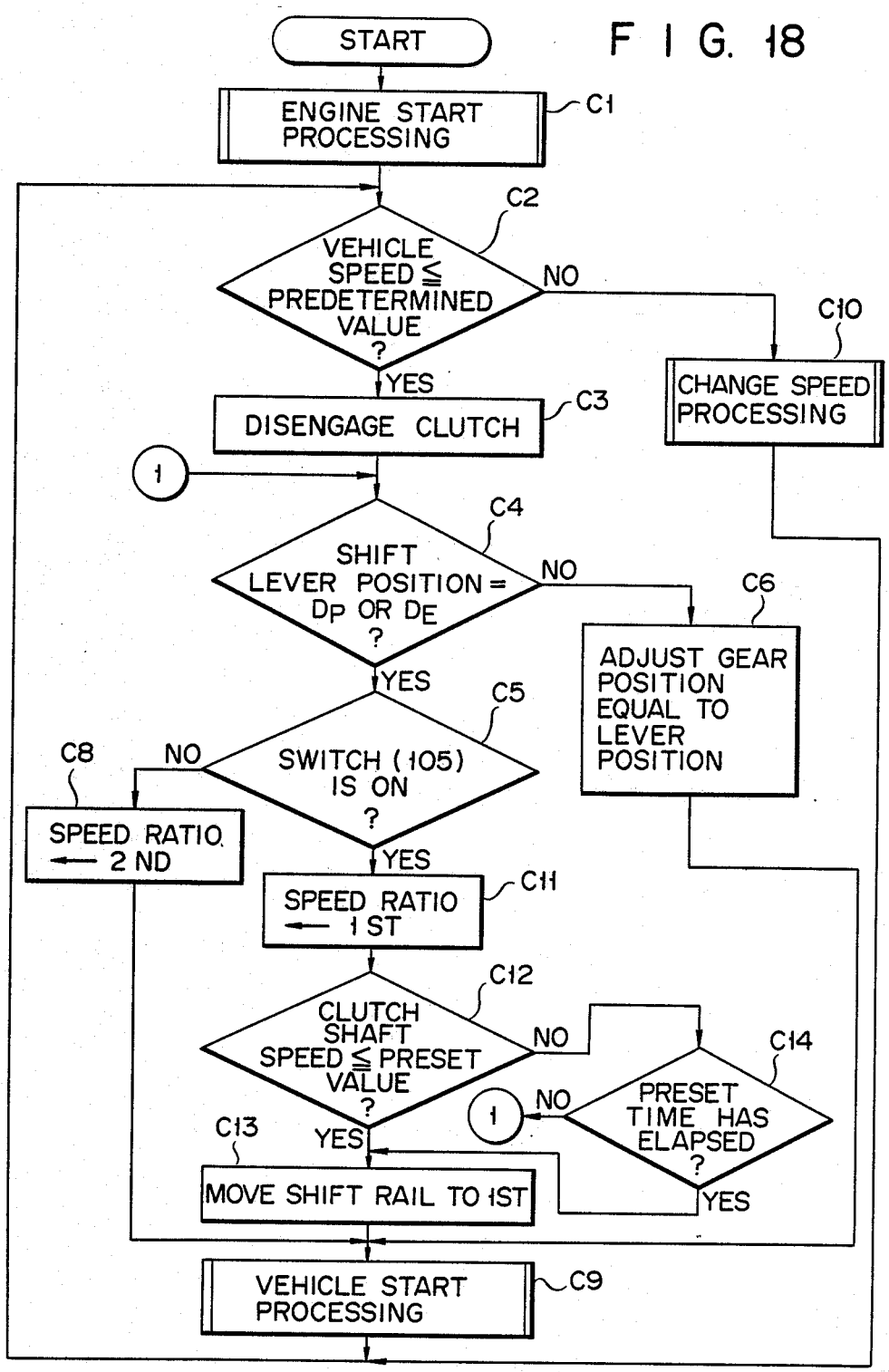

Referring to FIG. 18, after the program is started, the engine start processing (step C1), the decision of whether or not the vehicle is stopped (step C2), the disengaging operation of clutch 15 (step C3), the decision of whether or not the $D_P$ or $D_E$ range is selected (step C4), and the decision of whether or not 1st-speed start switch 105 is turned on (step C5) are performed in the same manner as those in the main routine of FIG. 17. If the flow advances from step C5 to step C11, change speed unit 65 is operated, so that the shift line of R-1st is selected. It is checked in step C12 if rotational speed N1 of input shaft 39 is decreased below rotational speed Ng of the predetermined value. If YES in step S12, the flow advances to step C13 and the shift rail is shifted to 1st. Conversely, if NO in step S12, the flow advances to step C14 to check if predetermined time Tm has elapsed from the disengagement of clutch 15. If YES in step C14, the flow advances to step C13; otherwise, the control is repeated from step C4 until the predetermined time has elapsed.

In this way, after the speed ratio is set in a given start range, the vehicle start processing (step C9) is performed in the same manner as in the main routine of FIG. 17. Next, the flow advances from step C5 to step C8 to set the normal start range in the 2nd speed, the flow advances from step C4 to step C6 to coincide the speed ratio with the designated speed ratio, or the flow advances from step C2 to step C10 to perform the transmission processing.

According to the fifth embodiment, only when 1st-speed start signal is supplied is the start range set in the 1st-speed range. The 1st-speed gear train is meshed after awaiting a decrease in rotational speed N1 of input shaft 39 of transmission 17, thus preventing gears from grinding.

Sixth embodiment of the main routine will now be described with reference to FIG. 19. The same automatic transmission apparatus as that for the main routine in FIG. 17 is used for the main routine in FIG. 19, and FIG. 19 includes the same control steps as those in the flow chart shown in FIG. 17. Thus, a description of these will be omitted.

Figure 19:
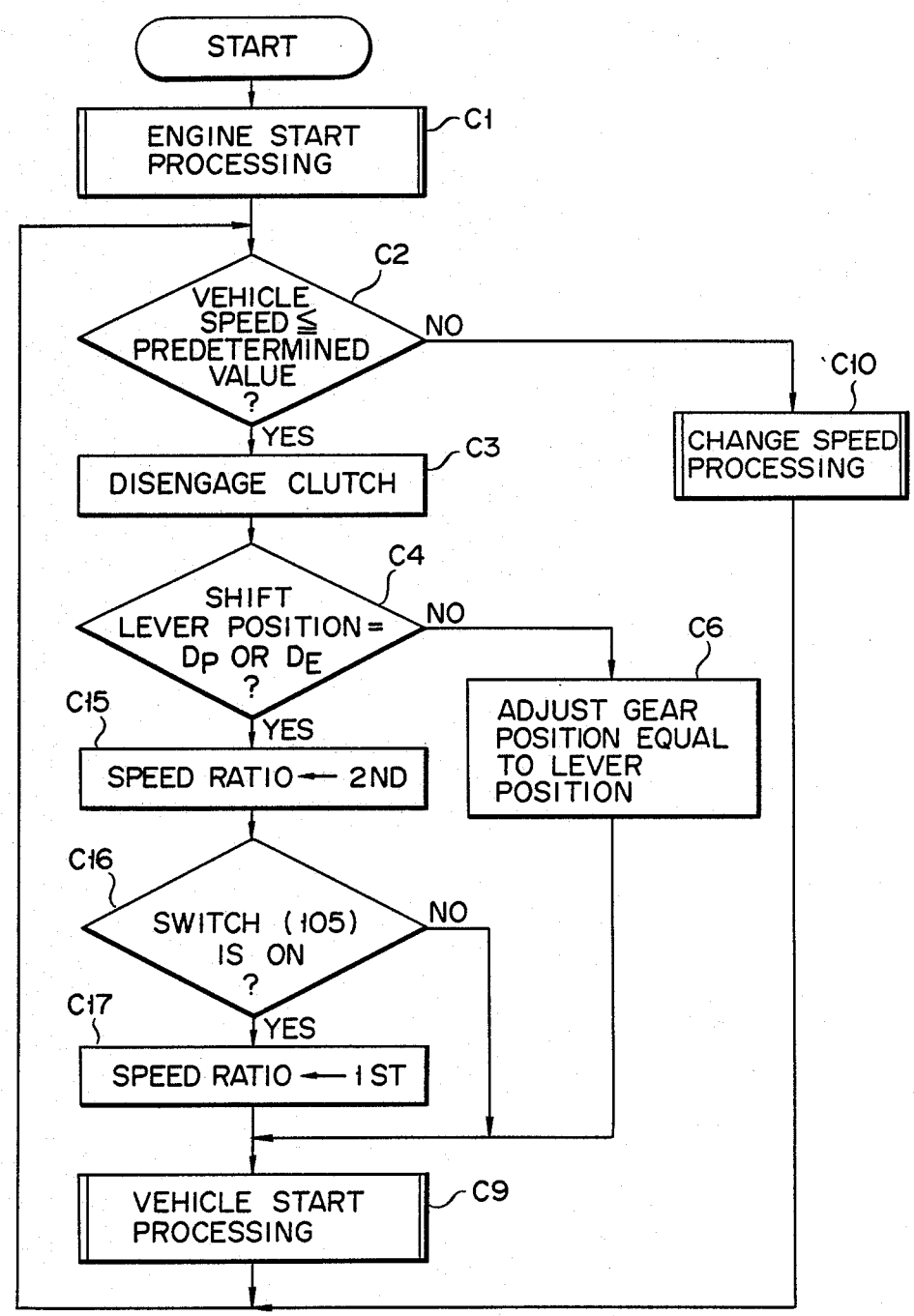

Referring to FIG. 19, after the program is started, the engine start processing (step C1), the decision of whether or not the vehicle is stopped (step C2), the disengaging operation of clutch 15 (step C3), the decision of whether or not the $D_P$ or $D_E$ range is selected (step C4), and the decision of whether or not 1st-speed start switch 105 is turned on (step C5) are performed in the same manner as those in the main routine of FIG. 17. If the flow advances from step C4 to C15, change speed unit 65 is operated to change the speed ratio to the 2nd range. A 2nd-speed gear train having a synchronizing mechanism is meshed without grinding, thus stopping input shaft 39 and the counter shaft, which have been rotating. Subsequently, it is checked in step C16 if a 1st-speed designation signal is supplied by turning on 1st-speed start switch 105. If YES in step C16, the flow advances to step C17; otherwise, i.e., in a normal 2nd-speed start mode, since the speed ratio is already set in the 2nd-speed range, the flow advances to step C9. In step C17, the speed ratio is changed from the 2nd-speed range to the 1st-speed range. At this time, since the counter shaft is not rotated, the change speed operation can be performed without grinding the gears.

After the speed ratio is set in the predetermined start range, the vehicle start processing (step C9) is performed as in the main routine shown in FIG. 17. In addition, the flow advances from step C4 to step C6 to coincide the speed ratio with the designation speed ratio, or the flow advances from step C2 to step C10 to perform the change speed processing, as in the main routine shown in FIG. 17.

In the main routine of FIG. 19, only when 1st-speed start signal is input is the start range set in the 1st-speed range after the speed ratio is changed to the 2nd-speed range in advance, thus completely preventing gears from grinding when the speed ratio is changed to the 1st-speed range.

According to the fourth embodiment, if a vehicle adopts an automatic transmission apparatus which uses the 2nd speed or higher as the normal start range, the start range can be set in the 1st-speed range only when a 1st-speed start signal is input. Therefore, start operation of the automatic transmission apparatus can be stabilized when over-load running or steep-slope starting is frequently performed. In addition, according to the fifth and sixth embodiment, the start operation can be stabilized as well as that in FIG. 17, and gears can be prevented from grinding when the speed ratio is changed to the 1st-speed range without using a synchronizing mechanism of the 1st-speed range gear train.

Figure 20:
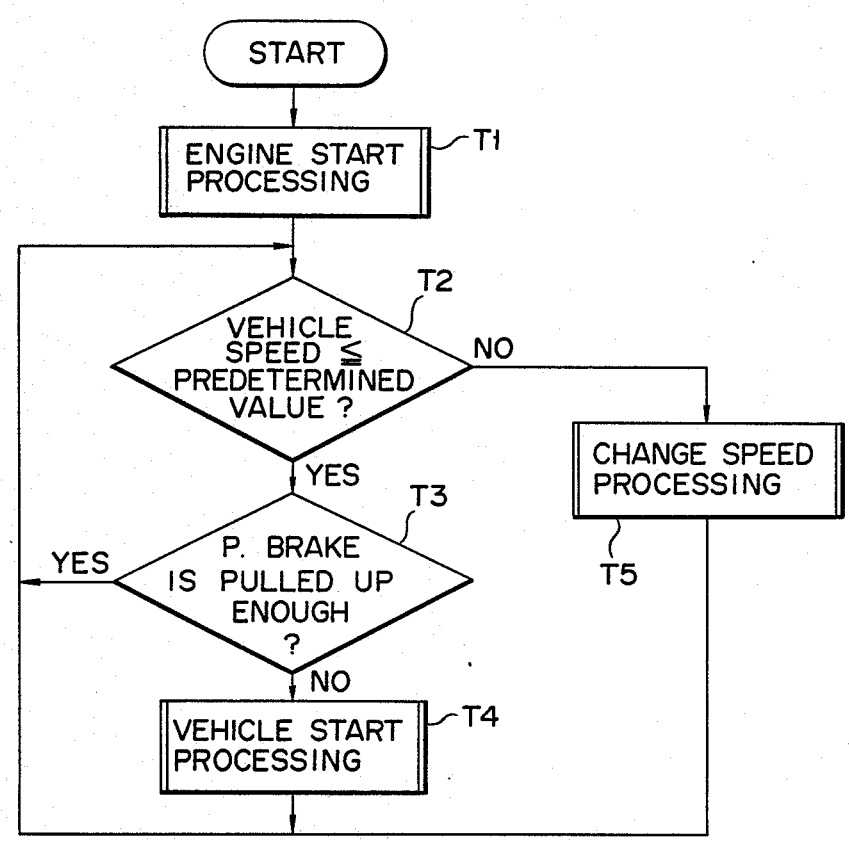

A main routine according to a seventh embodiment for preventing accidental vehicle start will be described with reference to FIG. 20. First, engine start processing is performed based on checking of respective parts, fetching of input signals, and various other preprocessing (step T1). After the engine starts, it is checked in step T2 if the vehicle speed is lower than a predetermined value, thus determining that the vehicle will stop or move. If YES is obtained in step T2 and the flow advances to step T3, it is checked if parking brake signal is supplied, i.e., if the parking brake 87a is pulled and held in a braking position. If YES in step T3, the flow returns to step T2; otherwise, the flow enters the vehicle start processing in step T4. In step T4, an actuation signal is supplied to solenoid valves 51 and 53 to disengage clutch 15, and a gear train of a transmission is aligned with the start range. When an accelerator pedal depression amount (based on a load signal) exceeds a preset value, clutch 15 is gradually moved in the engaging direction to gradually adjust the engine rotation and that of the clutch output shaft. When they coincide with each other, clutch 15 is fully engaged. Thereafter, the flow returns.

Note that if NO in step T2, the flow enters the change speed processing in step T5. In the change speed processing, clutch 15 is disengaged based on a change speed signal, a vehicle speed signal, load signal S1, and the like, and during the disengagement, an actuation signal is supplied to solenoid valves 73 of gear shift unit 65 to operate it. Thus, a speed ratio is changed to the target speed ratio, and thereafter, solenoid valves 51 and 53 are operated to engage clutch 15. Thereafter, the flow returns.

When the stopped vehicle is to be started, it cannot execute the vehicle start processing unless parking brake 87a is returned from the braking position to the release position to cancel the parking-brake signal. More specifically, unless an operator intends to start the vehicle and releases the parking brake, even if the speed ratio is set in the start range due to erroneous operation or the mischievous action by a child, and a load signal exceeds a preset value, the vehicle can no longer be started.

When such a clutch switching device is operated during the vehicle start processing, control unit 71 checks input signals from respective sensors and turns off the outputs to solenoid valves 51, 53, and 53a so as to hold clutch 15 in the engaged state and perform initialization, thus initiating the vehicle start processing.

Figure 21:
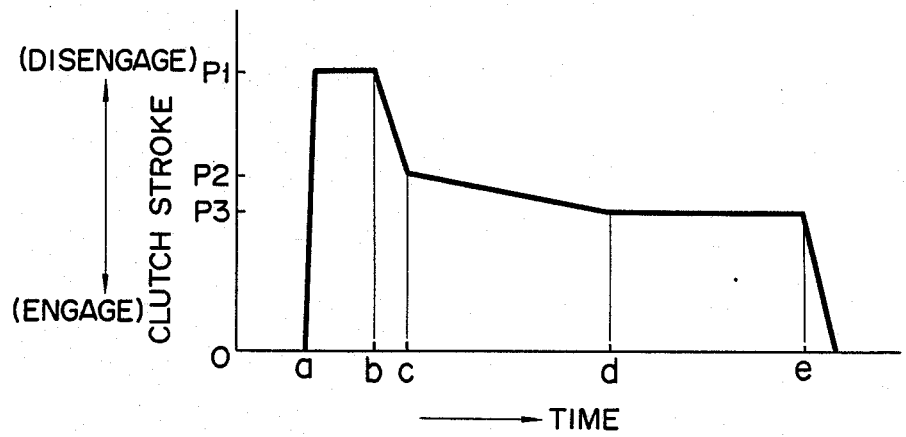
FIG. 21 is a graph showing a change in clutch stroke over time.
Figure 22:
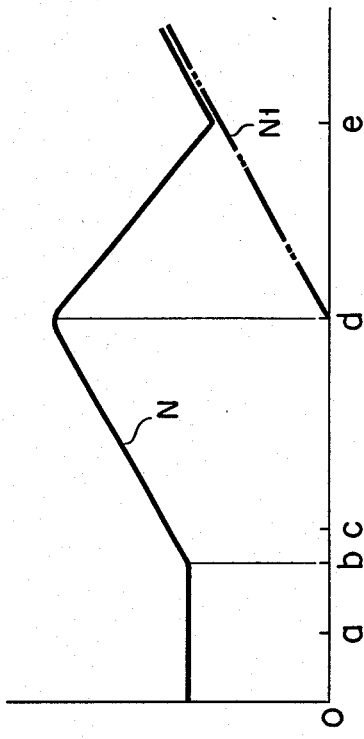
FIG. 22 is a graph showing changes in engine speed N and clutch output shaft speed N1 over time.
Figure 23:
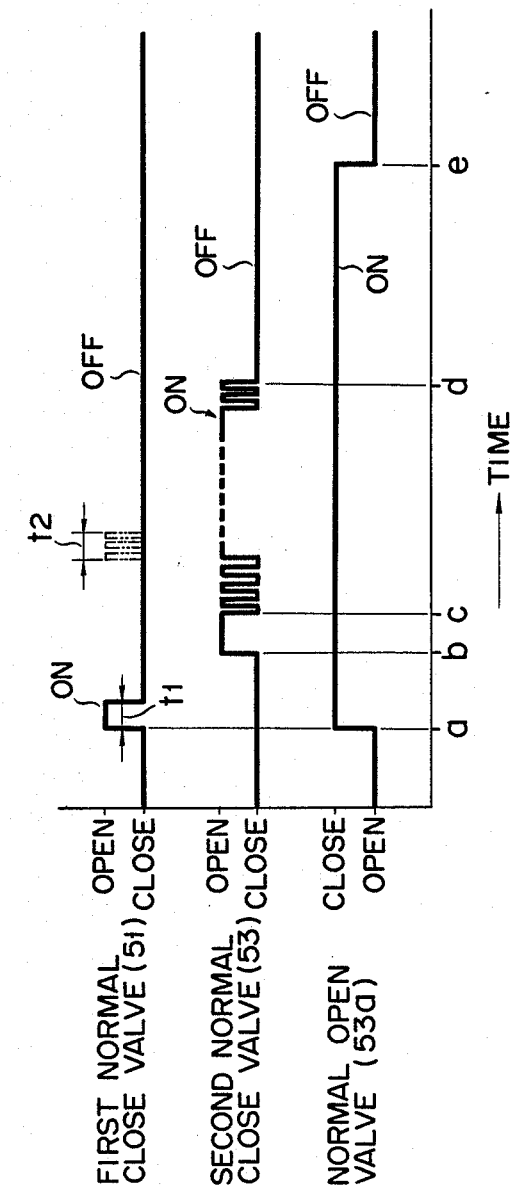
FIG. 23 is a timing chart of three solenoid valves.

As shown in FIGS. 21 to 23, at time a, a drive signal is supplied to solenoid valve 51 for relatively short time interval t1, and is also supplied to solenoid valve 53a to continuously close it from time a, thus initiating the vehicle start processing. Clutch 15 is fully disengaged until time b, and at that time, valve 53 receives a pulse signal at a predetermined duty ratio to be open/closed, thus decreasing a clutch pneumatic pressure to predetermined value P2 at time c. From time c, solenoid valve 53 is open/closed by a pulse signal at a duty ratio smaller than duty ratio $\alpha$, thus gradually decreasing the clutch pneumatic pressure as time elapses. Next, clutch 15 is set in the half-engaged state. When clutch 15 is engaged too fast, solenoid valve 51 is duty-controlled to be open/closed for predetermined time

What is claimed is:

1. An automatic transmission apparatus for a vehicle, comprising:
   a load sensor for detecting a load on an engine;
   a friction clutch connected to an output shaft of said engine;
   a clutch actuator for operating said friction clutch;
   a clutch sensor for detecting a position of said friction clutch;
   a parallel shaft type gear transmission having an input shaft connected to said friction clutch;
   speed ratio changing means for changing a speed ratio of said parallel-shaft gear transmission;
   change speed control means for operating said speed ratio changing means in response to signals from vehicle drive condition detecting means and drive command means which can instruct a slope-start mode; and start control means which actuates said clutch actuator to move said friction clutch to a standby position at a time just before the clutch is in the half-engaged state, when it is determined that start control is to be initiated in accordance with the speed ratio and an output from said drive condition detecting means, and starts to move said friction clutch to an engaged position when said load sensor detects an increase in load;

wherein, when said drive command means instructs the slope-start mode, said speed ratio changing means changes said parallel shaft type gear transmission to a slope-start speed ratio, and said start control means operates a wheel brake device of the vehicle and starts to move the clutch to the engaged position when said drive condition detecting means detects a braking force being applied to the vehicle operated by a parking brake of the vehicle, and said start control means maintains the operation of said wheel brake device until and engine rotation speed changes from an increase to a decrease state when the friction clutch reaches an engaged position.

2. An apparatus according to claim 1, wherein said start control means makes an exhaust brake device provided in said engine inoperative when start control means is initiated.

3. An apparatus according to claim 1, wherein said change speed control means changes said parallel shaft type gear transmission to a 1st-speed range in response to a 1st-speed start command from said drive command means.

4. An apparatus according to claim 3, wherein when a rotational speed of said friction clutch detected by said drive condition detecting means is lower than a preset value after said friction clutch is disengaged, said change speed control means changes said parallel shaft type gear transmission to a 1st-speed range.

5. An apparatus according to claim 3, wherein said change speed control means changes said parallel shaft type gear transmission to a 2nd-speed range and then changes it to the 1st-speed range.

6. An apparatus according to claim 1, wherein said start control means is operated by a parking-brake release signal from said drive condition detecting means and a load signal higher than a preset value from said load sensor.

7. An apparatus according to claim 1, further comprising: a normally closed first solenoid valve which can connect a fluid chamber of said clutch actuator to a high-pressure fluid source;

a normally closed second solenoid valve which can connect said fluid chamber to a low pressure side at an arbitrary time ratio; and a normally open solenoid valve which can shut off said fluid chamber to the low pressure side, and wherein said start control means controls said solenoid valves so that said clutch is gradually displaced in its engaging direction.

8. An apparatus according to claim 1, wherein when a load detected by said load sensor is less than a first preset value, said start control means operates said wheel brake device until the engine rotation speed starts to decrease after the peak point, and said start control means maintains the operation of said wheel brake device until an engine rotation speed changes from an increase to a decrease state when the friction clutch reaches the engaged position.

9. A start control device used for an automatic transmission apparatus, comprising:

an engine control means for controlling engine speed;

a friction clutch connected to an output shaft of said engine;

a clutch actuator for operating said friction clutch;

a parallel shaft type gear transmission having an input shaft connected to said friction clutch;

speed ratio changing means for changing a speed ratio of said parallel-shaft gear transmission;

a wheel brake control means for controlling an operation of the wheel brake of a vehicle;

a driving state detection means for detecting the driving state of a vehicle, a start judging means for determining whether said speed ratio changing means has been shifted to the start range by signals emitted from said driving state detection means;

a parking brake judge means for determining whether a parking brake of a vehicle has been operated, from a parking brake signal detected by said driving state detection means;

a wheel brake operation signal output means for outputting a brake operation signal to said wheel brake control means when said parking brake judging means detects the parking brake operation after said start judging means detects that said speed ratio changing means has been shifted to the start range;

a standby position signal output means for outputting a signal to said clutch actuator so as to move said friction clutch to a standby position immediately before a clutch half-engaged state, when the wheel brake of a vehicle is operated by said wheel brake control means upon receiving a signal output from said wheel brake operation signal output means;

an engine speed increase means for outputting a signal for engine speed increase to said engine control means in accordance with a signal for the amount of acceleration, emitted from said driving state detection means when said friction clutch is transferred to said standby position by said clutch actuator;

a connect position signal output means for outputting an operation signal to said clutch actuator in order to transfer said friction clutch stepwise from said standby position to a connecting position, in accordance with a signal emitted from said engine speed increase means;

a peak state detection means for determining whether the engine speed has reached a peak state, when the engine speed is increased by said engine speed increase means after said friction clutch is transferred in a connecting direction by a signal output from said connection position signal output means;

a wheel brake release signal output means for outputting a signal for brake release to said wheel brake control means, when said peak state detection means detects the peak state of the engine speed.

10. An apparatus according to claim 9, comprising:

an exhaust brake control device for switching an exhaust brake device to an inoperative state when said start judging means detects said speed ratio changing means has been shifted to the start range.

11. An apparatus according to claim 9, wherein when start judging means detects said speed ratio changing means has shifted to the start range, and when said parking brake judge means detects an operation of the parking brake, and when a signal for indicating the rotational speed of said friction clutch, as an output from said driving state detection means, is equal to or less than a predetermined value, said wheel brake operation means outputs a brake operation signal to said wheel brake means.

12. An apparatus according to claim 9, wherein said engine speed increase means outputs a signal for increasing the engine speed, in accordance with a signal indicating the amount by which an acceleration pedal has been depressed, output from said driving state detection means, when said signal for indicating the amount by which the acceleration pedal has been depressed, is at a level falling within the predetermined range.

* * * * *

UNITED STATES PATENT AND TRADEMARK OFFICE
CERTIFICATE OF CORRECTION

PATENT NO.   :   4,899,857

DATED        :   2/13/90

INVENTOR(S)  :   Toshiaki Tateno et al.

It is certified that error appears in the above-identified patent and that said Letters Patent is hereby corrected as shown below:

Title page, Foreign Application Priority Data

"60-53601"     should read     -- 60-53601(U) --
"60-95972"     should read     -- 60-95972(U) --
"60-150062"    should read     -- 60-150062(U) --

Signed and Sealed this

Second Day of July, 1991

*Attest:*

HARRY F. MANBECK, JR.

*Attesting Officer*      *Commissioner of Patents and Trademarks*